US010295292B2

(12) United States Patent
Ding et al.

(10) Patent No.: US 10,295,292 B2
(45) Date of Patent: May 21, 2019

(54) COMPONENTS AND SUBASSEMBLIES OF A POD SYSTEM AND A FIREARM IMPLEMENT SYSTEM

(71) Applicant: Leapers, Inc., Livonia, MI (US)

(72) Inventors: Tai-Lai Ding, Northville, MI (US); Tat Shing Yu, Plymouth, MI (US)

(73) Assignee: Leapers, Inc., Livonia, MI (US)

( * ) Notice: Subject to any disclaimer, the term of this patent is extended or adjusted under 35 U.S.C. 154(b) by 17 days.

(21) Appl. No.: 15/394,250

(22) Filed: Dec. 29, 2016

(65) Prior Publication Data

US 2017/0205180 A1 Jul. 20, 2017

Related U.S. Application Data

(60) Provisional application No. 62/279,460, filed on Jan. 15, 2016.

(51) Int. Cl.

*F41A 23/02* (2006.01)
*F41A 23/06* (2006.01)

(Continued)

(52) U.S. Cl.

CPC .............. *F41A 23/02* (2013.01); *F16G 11/10* (2013.01); *F16M 11/16* (2013.01); *F16M 11/247* (2013.01); *F16M 11/28* (2013.01); *F41A 23/06* (2013.01); *F41A 23/10* (2013.01); *F41C 23/16* (2013.01); *F16M 2200/024* (2013.01); *F16M 2200/028* (2013.01)

(58) Field of Classification Search

CPC .... F41A 23/02–16; F41A 23/56; F41C 23/16; F16M 11/16; Y10T 292/288; Y10T 292/293; Y10T 292/296; Y10T 292/093; Y10T 292/0947; Y10T 292/1056; Y10T 292/1077; E05C 3/30; E05C 17/50

USPC ............ 89/37.04, 37.11, 40.01, 40.06; 42/94

See application file for complete search history.

(56) References Cited

U.S. PATENT DOCUMENTS 1,954,500 A * 4/1934 Sparks ...................... E05C 3/30 292/127
5,020,835 A * 6/1991 Poe ..................... E05B 17/2088 292/106

(Continued)

*Primary Examiner* — Stephen Johnson
*Assistant Examiner* — Benjamin S Gomberg
(74) *Attorney, Agent, or Firm* — Honigman LLP

(57) ABSTRACT

A biased latch subassembly is disclosed. The biased latch subassembly includes a shaft body, a rocker latch, a latch pin, a biasing member and a latch actuator. The latch pin rotatably-connects the rocker latch to the shaft body. The biasing member is disposed against the rocker latch and the shaft body. The latch actuator engages a portion of the shaft body. The latch actuator is manipulatable between at least a first position relative the shaft body and a second position relative the shaft body. When the latch actuator is arranged in the first position, the latch actuator urges the rocker latch into an un-latched position with the shaft body. When the latch actuator is arranged in the second position, the latch actuator permits the rocker latch to assume a latched position relative the shaft body. A pod assembly is also disclosed, which includes the biased latch subassembly and an indexing plate. A firearm implement system is also disclosed and includes a firearm and at least one pod assembly attached thereto. Methods are also disclosed.

16 Claims, 25 Drawing Sheets

(51) Int. Cl.

| | |
|---|---|
| ***F41A 23/10*** | (2006.01) |
| ***F41C 23/16*** | (2006.01) |
| ***F16M 11/16*** | (2006.01) |
| ***F16M 11/24*** | (2006.01) |
| ***F16M 11/28*** | (2006.01) |
| ***F16G 11/10*** | (2006.01) |

(56) References Cited

U.S. PATENT DOCUMENTS

| | | | | |
|---|---|---|---|---|
| 5,937,560 | A | 8/1999 | Beltz | |
| 7,100,318 | B1 | 9/2006 | Beltz | |
| 7,614,174 | B1 | 11/2009 | Beltz | |
| 7,654,498 | B1 | 2/2010 | Beltz | |
| 7,793,454 | B1 | 9/2010 | Beltz | |
| 8,402,684 | B1 | 3/2013 | Beltz | |
| 8,904,693 | B1 | 12/2014 | Beltz | |
| 9,255,751 | B1 | 2/2016 | Beltz | |
| 9,303,940 | B2 | 4/2016 | Bonelli et al. | |
| 2014/0115940 | A1 | 5/2014 | Bonelli et al. | |
| 2014/0338245 | A1* | 11/2014 | Lanasa .................... | F41C 23/16 42/72 |
| 2016/0209172 | A1 | 7/2016 | Trotabas | |

* cited by examiner

COMPONENTS AND SUBASSEMBLIES OF A POD SYSTEM AND A FIREARM IMPLEMENT SYSTEM

CROSS-REFERENCE TO RELATED APPLICATIONS

This U.S. patent application claims priority to U.S. Provisional Application 62/279,460 filed on Jan. 15, 2016, the disclosure of which is considered part of the disclosure of this application and is hereby incorporated by reference in its entirety.

TECHNICAL FIELD

This disclosure relates to a subassemblies and components of a pod assembly and a firearm implement system

BACKGROUND

Pods (such as, without limitation, camera supports, firearm supports and the like, which may be configured as mono-pods, bi-pods, tri-pods and the like) are known. While existing pods perform adequately for their intended purpose, improvements to pods are continuously being sought in order to advance the arts.

SUMMARY

This section provides a general summary of the disclosure, and is not a comprehensive disclosure of its full scope or all of its features.

One aspect of the disclosure provides a biased latch subassembly. The biased latch subassembly includes a shaft body, a rocker latch, a latch pin, a radial biasing member, a latch actuator pull sleeve, a rocker latch-engaging finger and an axial biasing member. The shaft body defines a plurality of passages including at least a first passage and a second passage. The rocker latch is disposed within the first passage. The latch pin extends through the second passage and a co-axially-aligned latch pin-receiving passage of the rocker latch for rotatably-connecting the rocker latch to the shaft body. The radial biasing member is disposed within the first passage between a radial biasing member engagement surface of the first passage and a radial-outwardly-urging surface of the rocker latch. The latch actuator pull sleeve has an axial passage sized for receiving a portion of a length of the shaft body. The latch actuator pull sleeve is slidably-disposed about an outer surface portion of the shaft body and at least a portion of a length of a radial-inwardly-urging surface of the rocker latch exposed by the first passage. The rocker latch-engaging finger is secured within a radial passage of the latch actuator pull sleeve. The radial passage is in fluid communication with the axial passage of the latch actuator pull sleeve and the first passage of the shaft body. A rocker-latch-engaging surface of the rocker latch-engaging finger is disposed adjacent a radial-inwardly-urging surface of the rocker latch. The axial biasing member includes an inner surface defining an axial passage extending between a proximal surface of the axial biasing member and a distal surface of the axial biasing member. The axial passage of the axial biasing member is sized for receiving some of the portion of the length of the shaft body. A first portion and a second portion of an inner surface of the latch actuator pull sleeve in combination with some of a first portion and a second portion of the outer surface portion of the shaft body forms a cavity that is sized for receiving the axial biasing member.

Implementations of the disclosure may include one or more of the following optional features. For example, the axial biasing member imparts an axial bias to the latch actuator pull sleeve relative the shaft body as a result of: the proximal surface of the axial biasing member being disposed adjacent the second portion of the outer surface portion of the shaft body and the distal surface of the axial biasing member being disposed adjacent the second portion of the inner surface of the latch actuator pull sleeve.

In some implementations, the axial bias imparted by the axial biasing member to the latch actuator pull sleeve relative the shaft body urges slidable adjustment of the rocker-latch-engaging surface of the rocker latch-engaging finger from a proximal end of the radial-inwardly-urging surface of the rocker latch toward a distal end of the radial-inwardly-urging surface of the rocker latch for inducing first direction rotation of the rocker latch about the latch pin.

In some examples, an axial pull force imparted to the latch actuator pull sleeve that is opposite the axial bias imparted by the axial biasing member to the latch actuator pull sleeve urges slidable movement of latch actuator pull sleeve relative the shaft body such that the rocker latch-engaging finger is slidably-adjusted from the distal end of the radial-inwardly-urging surface of the rocker latch toward the proximal end of the radial-inwardly-urging surface of the rocker latch for inducing second direction rotation of the rocker latch about the latch pin that is opposite to the first direction rotation.

In some implementations, the axial pull force imparted to the latch actuator pull sleeve also results in a reduced axial spacing between the outer surface portion of the shaft body and the second portion of the inner surface of the latch actuator pull sleeve for axially collapsing the cavity for compressing the axial biasing member between the second portion of the outer surface portion of the shaft body and the second portion of the inner surface of the latch actuator pull sleeve.

In some examples, the second passage radially traverses and is in fluid communication with the first passage.

In some implementations, the second passage is radially offset from the first passage by approximately 180°.

In some examples, the first portion of the outer surface portion of the shaft body is defined by a first diameter of the shaft body. The second portion of the outer surface portion of the shaft body projects radially away from the first portion of the outer surface portion of the shaft body for defining a second diameter of the shaft body.

In some implementations, the first diameter of the shaft body is less than the second diameter of the shaft body.

In some examples, the first portion of the inner surface portion of the latch actuator pull sleeve defines a first passage diameter of the axial passage of the latch actuator pull sleeve. The second portion of the inner surface portion of the latch actuator pull sleeve projects radially inwardly from the first portion of the inner surface portion of the latch actuator pull sleeve for defining a second passage diameter of the axial passage of the latch actuator pull sleeve.

In some implementations, the first passage diameter of the axial passage of the latch actuator pull sleeve is greater than the second passage diameter of the axial passage of the latch actuator pull sleeve.

Another aspect of the disclosure provides an indexing plate. The indexing plate includes a plate body defining a device-engaging body portion and a biased latch subassembly-engaging body portion extending from the device-engaging body portion at a biased latch subassembly-engaging body portion angle. The device-engaging body portion includes an inner surface, an outer surface, an upper surface and a lower surface. The device-engaging body portion is further defined by a thickness extending between the inner surface and the outer surface. The device-engaging body portion defines at least one fastener passage extending through the thickness. An outer surface of the biased latch subassembly-engaging body portion defines a plurality of rocker latch-receiving recesses that extend into a thickness of the biased latch subassembly-engaging body portion at a depth. The thickness of the biased latch subassembly-engaging body portion is bound by the outer surface of the biased latch subassembly-engaging body portion and an inner surface of the biased latch subassembly-engaging body portion. The depth is not equal to the thickness of the biased latch subassembly-engaging body portion. Each rocker latch-receiving recess of the plurality of rocker latch-receiving recesses includes a recess surface and a perimeter recess surface. The plate body further defines an indexing plate pivot-pin-receiving passage extending through at least one of the firearm-engaging body portion and the biased latch subassembly-engaging body portion.

Implementations of the disclosure may include one or more of the following optional features. For example, the perimeter recess surface is connected to and extends substantially perpendicularly from the outer surface of the biased latch subassembly-engaging body portion.

In some implementations, the recess surface is connected to and extends substantially perpendicularly from the perimeter recess surface at a distance approximately equal to the depth such that the plurality of rocker latch-receiving recesses do not extend through the entire thickness of the biased latch subassembly-engaging body portion.

In some examples, the plurality of rocker latch-receiving recesses include at least two rocker latch-receiving recesses.

In some implementations, the at least two rocker latch-receiving recesses include: a neutral leg orientation recess, at least one positively-indexed leg orientation recess that is positively arcuately offset from the neutral leg orientation recess, and at least one negatively-indexed leg orientation recess that is negatively arcuately offset from the neutral leg orientation recess.

In some examples, the at least one positively-indexed leg orientation recess includes: a first positively-indexed leg orientation recess that is positively arcuately offset from the neutral leg orientation recess at a first positive distance and a second positively-indexed leg orientation recess that is positively arcuately offset from the neutral leg orientation recess at a second positive distance that is greater than the first positive distance. The at least one negatively-indexed leg orientation recess includes: a first negatively-indexed leg orientation recess that is negatively arcuately offset from the neutral leg orientation recess at a first negative distance and a second negatively-indexed leg orientation recess that is negatively arcuately offset from the neutral leg orientation recess at a second negative distance that is greater than the first negative distance.

In some implementations, the first positively-indexed leg orientation recess is positively arcuately offset from the neutral leg orientation recess at an angle approximately equal to +45°. The second positively-indexed leg orientation recess is positively arcuately offset from the neutral leg orientation recess at an angle approximately equal to +90°. The first negatively-indexed leg orientation recess is negatively arcuately offset from the neutral leg orientation recess at an angle approximately equal to −45°. The second negatively-indexed leg orientation recess is negatively arcuately offset from the neutral leg orientation recess at an angle approximately equal to −90°.

In some examples, the device-engaging body portion is further defined by: a central body portion, a first lateral body portion and a second lateral body portion. Each of the first lateral body portion and the second lateral body portion are defined by a proximal end and a distal end. The central body portion extends between the proximal end of the first lateral body portion and the proximal end of the second lateral body portion.

In some implementations, the at least one fastener passage includes: a first fastener passage and a second fastener passage. The first fastener passage is defined by the first lateral body portion. The second fastener passage is defined by the second lateral body portion.

In some examples, the biased latch subassembly-engaging body portion extends from the central body portion of the firearm-engaging body portion.

In some implementations, the biased latch subassembly-engaging body portion angle is bound by a first reference plane that is aligned with and extends across the outer surface of the biased latch subassembly-engaging body portion and a second reference plane that is aligned with and extends across the outer surface of the firearm-engaging body portion. The second reference plane is substantially parallel to a third reference plane that is aligned with and extends across the inner surface of the firearm-engaging body portion.

In some examples, the biased latch subassembly-engaging body portion angle is approximately equal to 20°.

In some implementations, the indexing plate pivot-pin-receiving passage extends through at least one of the firearm-engaging body portion and the biased latch subassembly-engaging body portion between the inner surface of the firearm-engaging body portion and the outer surface of the biased latch subassembly-engaging body portion.

One aspect of the disclosure provides a pod assembly. The pod assembly includes a leg indexing portion including the leg indexing plate, the shaft body and a pivot pin. The shaft body of the biased latch subassembly defines a shaft body pivot-pin-receiving passage. The indexing plate pivot-pin-receiving passage of the indexing plate is co-axially aligned with the shaft body pivot-pin-receiving passage and the pivot pin is disposed within each of the indexing plate pivot-pin-receiving passage and the shaft body pivot-pin-receiving passage for pivotally-connecting the biased latch subassembly to the indexing plate.

Implementations of the disclosure may include one or more of the following optional features. For example, the axial biasing member imparts an axial bias to the latch actuator pull sleeve relative the shaft body while the radial biasing member imparts a radial bias to the rocker latch to impart rotation of the rocker latch for urging registration of a head portion of the rocker latch into a rocker latch-receiving recess of the plurality of rocker latch-receiving recesses to prevent pivotal movement of the biased latch subassembly relative to the indexing plate.

In some implementations, application of a pulling force to the latch actuator pull sleeve opposite the axial bias overcomes the axial bias imparted by the axial biasing member and the radial bias imparted by the radial biasing member in order to impart an opposite rotation of the rocker latch for de-registering the head portion of the rocker latch from the rocker latch-receiving recess of the plurality of rocker latch-receiving recesses to permit pivotal movement of the biased latch subassembly relative to the indexing plate.

One aspect of the disclosure provides a firearm implement system. The firearm implement system includes a firearm and the pod assembly. The firearm has at least one mounting rail. The device-engaging body portion of the plate body of the indexing plate of the pod assembly is attached to one mounting rail of the at least one mounting rail.

Implementations of the disclosure may include one or more of the following optional features. For example, the pod assembly is a mono-pod. Furthermore, the pod assembly may be a hand-grip.

In some implementations, the at least one mounting rail includes: a first lateral side mounting rail, a second lateral side mounting rail arranged opposite the first lateral side mounting rail and an upper mounting rail. The at least one mounting rail does not include a lower mounting rail arranged opposite the upper mounting rail. The one mounting rail that the device-engaging body portion of the pod assembly is attached to is the first lateral side mounting rail.

In some examples, the at least one mounting rail further includes: a first upper-intermediate side mounting rail arranged between the first lateral side mounting rail and the upper mounting rail, a second upper-intermediate side mounting rail arranged between the second lateral side mounting rail and the upper mounting rail, a first lower-intermediate side mounting rail arranged opposite the second upper-intermediate side mounting rail and a second lower-intermediate side mounting rail arranged opposite the first upper-intermediate side mounting rail.

One aspect of the disclosure provides a firearm implement system. The firearm implement system includes a firearm, a first pod assembly and a second pod assembly. The firearm has at least two mounting rails. The device-engaging body portion of the plate body of the indexing plate of a first pod assembly is attached to a first mounting rail of the at least two one mounting rails. The device-engaging body portion of the plate body of the indexing plate of a second pod assembly is attached to a second mounting rail of the at least two mounting rails.

Implementations of the disclosure may include one or more of the following optional features. For example, the first pod assembly and the second pod assembly cooperate with the firearm to form a bi-pod. Furthermore, at least one of the first pod assembly and the second pod assembly is a hand-grip.

In some implementations, the at least two mounting rails include: a first lateral side mounting rail, a second lateral side mounting rail arranged opposite the first lateral side mounting rail and an upper mounting rail. The at least two mounting rails do not include a lower mounting rail arranged opposite the upper mounting rail. The first mounting rail that the device-engaging body portion of the first pod assembly is attached to is the first lateral side mounting rail. The second mounting rail that the device-engaging body portion of the second pod assembly is attached to is the second lateral side mounting rail.

In some examples, the at least two mounting rails further includes: a first upper-intermediate side mounting rail arranged between the first lateral side mounting rail and the upper mounting rail, a second upper-intermediate side mounting rail arranged between the second lateral side mounting rail (and the upper mounting rail, a first lower-intermediate side mounting rail arranged opposite the second upper-intermediate side mounting rail and a second lower-intermediate side mounting rail arranged opposite the first upper-intermediate side mounting rail.

Yet another aspect of the disclosure provides a method of operating a biased latch subassembly including a shaft body, a rocker latch, a latch pin, a radial biasing member, a latch actuator pull sleeve, a rocker latch-engaging finger and an axial biasing member. The method includes: arranging the rocker latch within a first passage of the shaft body; co-axially aligning and extending the latch pin through a second passage that is co-axially-aligned with a latch pin-receiving passage of the rocker latch for rotatably-connecting the rocker latch to the shaft body; disposing the radial biasing member within the first passage between a radial biasing member engagement surface of the first passage and a radial-outwardly-urging surface of the rocker latch; slidably-disposing the latch actuator pull sleeve about an outer surface portion of the shaft body and at least a portion of a length of a radial-inwardly-urging surface of the rocker latch exposed by the first passage; securing the rocker latch-engaging finger within a radial passage of the latch actuator pull sleeve that is in fluid communication with the axial passage of the latch actuator pull sleeve and the first passage of the shaft body for disposing a rocker-latch-engaging surface of the rocker latch-engaging finger adjacent a radial-inwardly-urging surface of the rocker latch; arranging the axial biasing member including an inner surface defining an axial passage between a proximal surface of the axial biasing member and a distal surface of the axial biasing member. The axial passage of the axial biasing member is sized for receiving some of the portion of the length of the shaft body. A first portion and a second portion of an inner surface of the latch actuator pull sleeve in combination with some of a first portion and a second portion of the outer surface portion of the shaft body forms a cavity that is sized for receiving the axial biasing member. The method also includes: utilizing the axial biasing member for imparting an axial bias to the latch actuator pull sleeve relative the shaft body as a result of the proximal surface of the axial biasing member being disposed adjacent the second portion of the outer surface portion of the shaft body and the distal surface of the axial biasing member being disposed adjacent the second portion of the inner surface of the latch actuator pull sleeve. The axial bias imparted by the axial biasing member to the latch actuator pull sleeve relative the shaft body results in: urging slidable adjustment of the rocker-latch-engaging surface of the rocker latch-engaging finger from a proximal end of the radial-inwardly-urging surface of the rocker latch toward a distal end of the radial-inwardly-urging surface of the rocker latch for inducing first direction rotation of the rocker latch about the latch pin.

Implementations of the disclosure may include one or more of the following optional features. For example, the method also includes imparting an axial pull force to the latch actuator pull sleeve that is opposite the axial bias imparted by the axial biasing member to the latch actuator pull sleeve for urging slidable movement of latch actuator pull sleeve relative the shaft body for slidably-adjusting the rocker latch-engaging finger from the distal end of the radial-inwardly-urging surface of the rocker latch toward the proximal end of the radial-inwardly-urging surface of the rocker latch for inducing second direction rotation of the rocker latch about the latch pin that is opposite to the first direction rotation.

In some implementations, the axial pull force imparted to the latch actuator pull sleeve results in: reducing an axial spacing between the outer surface portion of the shaft body and the second portion of the inner surface of the latch actuator pull sleeve for axially collapsing the cavity for compressing the axial biasing member between the second portion of the outer surface portion of the shaft body and the second portion of the inner surface of the latch actuator pull sleeve.

Another aspect of the disclosure provides a method of operating a pod assembly including the biased latch subassembly and an indexing plate including a plate body defining a device-engaging body portion and a biased latch subassembly-engaging body portion extending from the device-engaging body portion at a biased latch subassembly-engaging body portion angle. The device-engaging body portion includes an inner surface, an outer surface, an upper surface and a lower surface. The device-engaging body portion is further defined by a thickness extending between the inner surface and the outer surface. The device-engaging body portion defines at least one fastener passage extending through the thickness. An outer surface of the biased latch subassembly-engaging body portion defines a plurality of rocker latch-receiving recesses that extend into a thickness of the biased latch subassembly-engaging body portion at a depth. The thickness of the biased latch subassembly-engaging body portion is bound by the outer surface of the biased latch subassembly-engaging body portion and an inner surface of the biased latch subassembly-engaging body portion. The depth is not equal to the thickness of the biased latch subassembly-engaging body portion. Each rocker latch-receiving recess of the plurality of rocker latch-receiving recesses includes a recess surface and a perimeter recess surface. The plate body further defines an indexing plate pivot-pin-receiving passage extending through at least one of the firearm-engaging body portion and the biased latch subassembly-engaging body portion. The method includes: forming a leg indexing portion by disposing a pivot pin within each of the indexing plate pivot-pin-receiving passage of the indexing plate and the shaft body pivot-pin-receiving passage of the biased latch subassembly for pivotally-connecting the biased latch subassembly to the indexing plate with a pivot pin by disposing the pivot pin within each of the indexing plate pivot-pin-receiving passage of the indexing plate and the shaft body pivot-pin-receiving passage of the biased latch subassembly.

Implementations of the disclosure may include one or more of the following optional features. For example, the imparted axial bias by the axial biasing member to the latch actuator pull sleeve relative the shaft body while the radial biasing member that imparts the radial bias to the rocker latch to impart the rotation of the rocker latch results in: urging registration of a head portion of the rocker latch into a rocker latch-receiving recess of the plurality of rocker latch-receiving recesses for preventing pivotal movement of the biased latch subassembly relative to the indexing plate.

In some implementations, the method includes: applying a pulling force to the latch actuator pull sleeve opposite the axial bias for overcoming the axial bias imparted by the axial biasing member and the radial bias imparted by the radial biasing member for imparting an opposite rotation of the rocker latch for de-registering the head portion of the rocker latch from the rocker latch-receiving recess of the plurality of rocker latch-receiving recesses for permitting pivotal movement of the biased latch subassembly relative to the indexing plate.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1A:
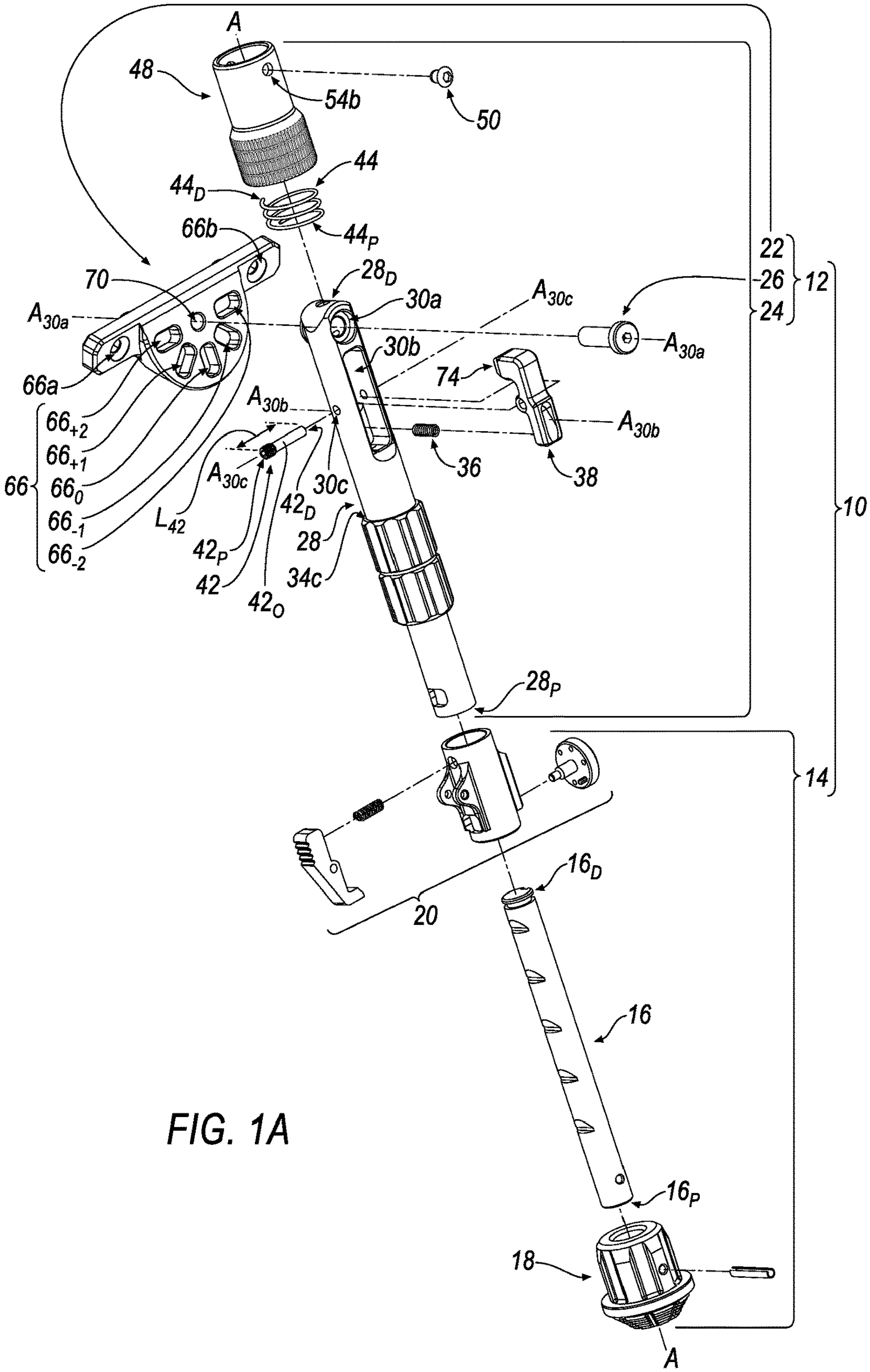
FIG. 1A is an exploded isometric view of an exemplary pod assembly.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 18A:
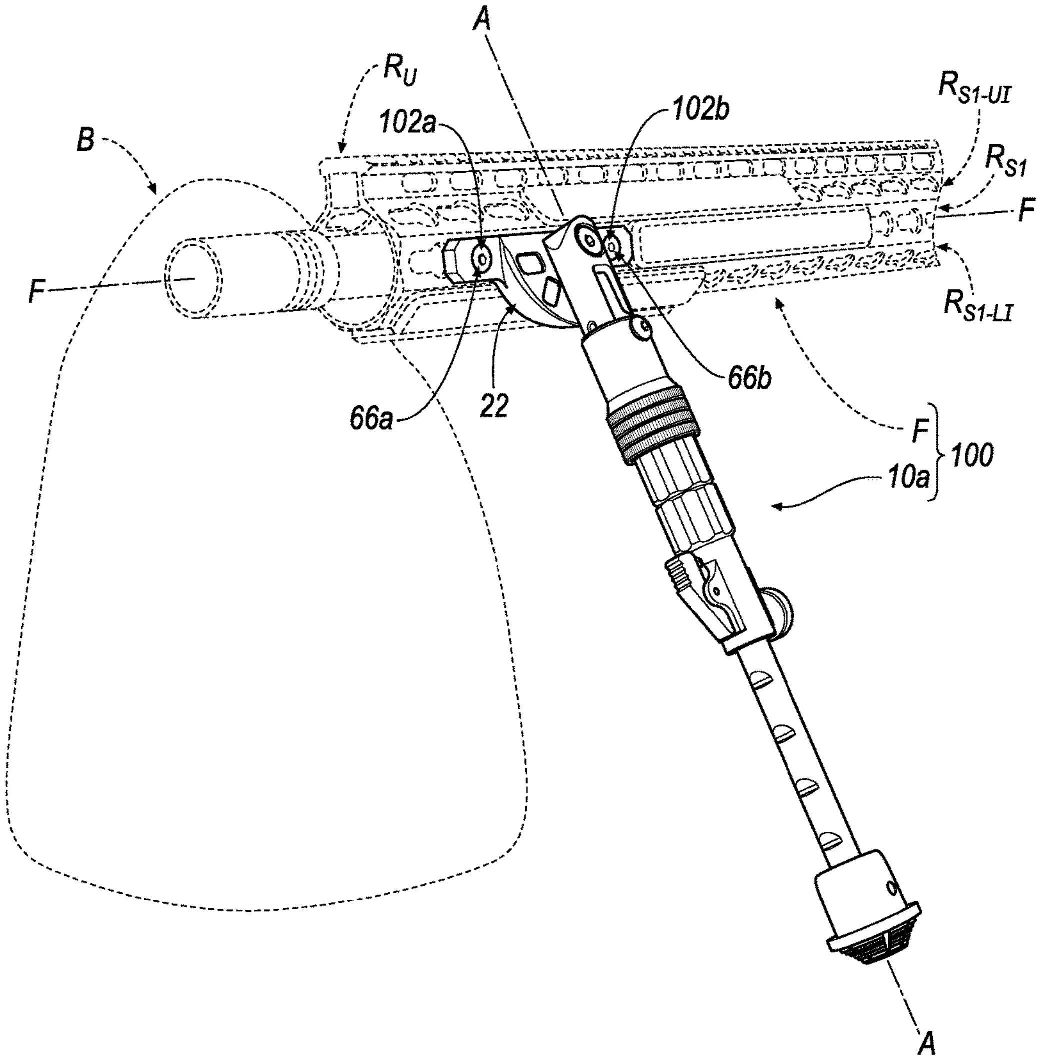
FIG. 18A is an isometric view of an exemplary firearm implement system including an exemplary pod assembly attached to a mounting rail of firearm.
Figure 18B:
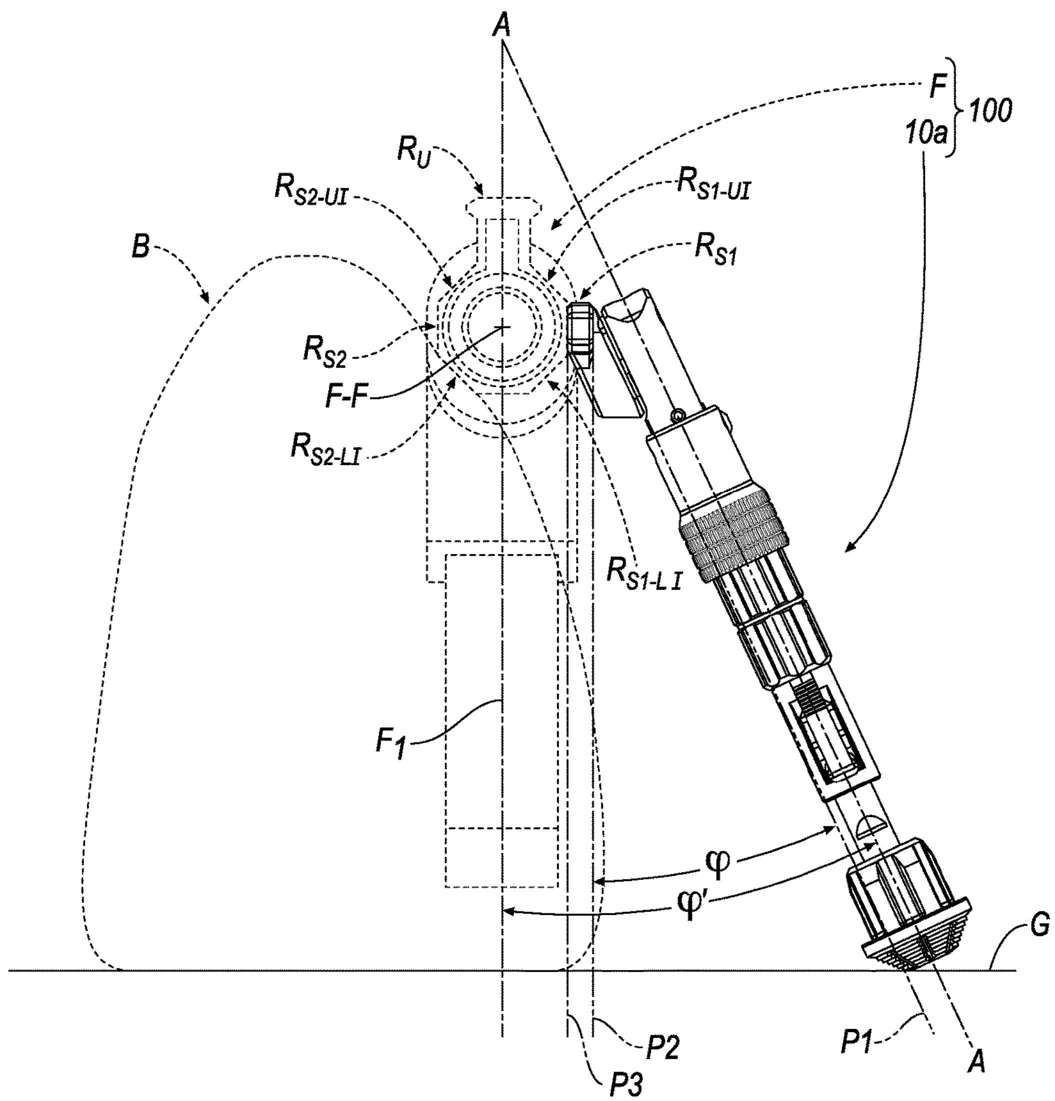
FIG. 18B is a front view of the firearm implement system of FIG. 18A.
Figure 19A:
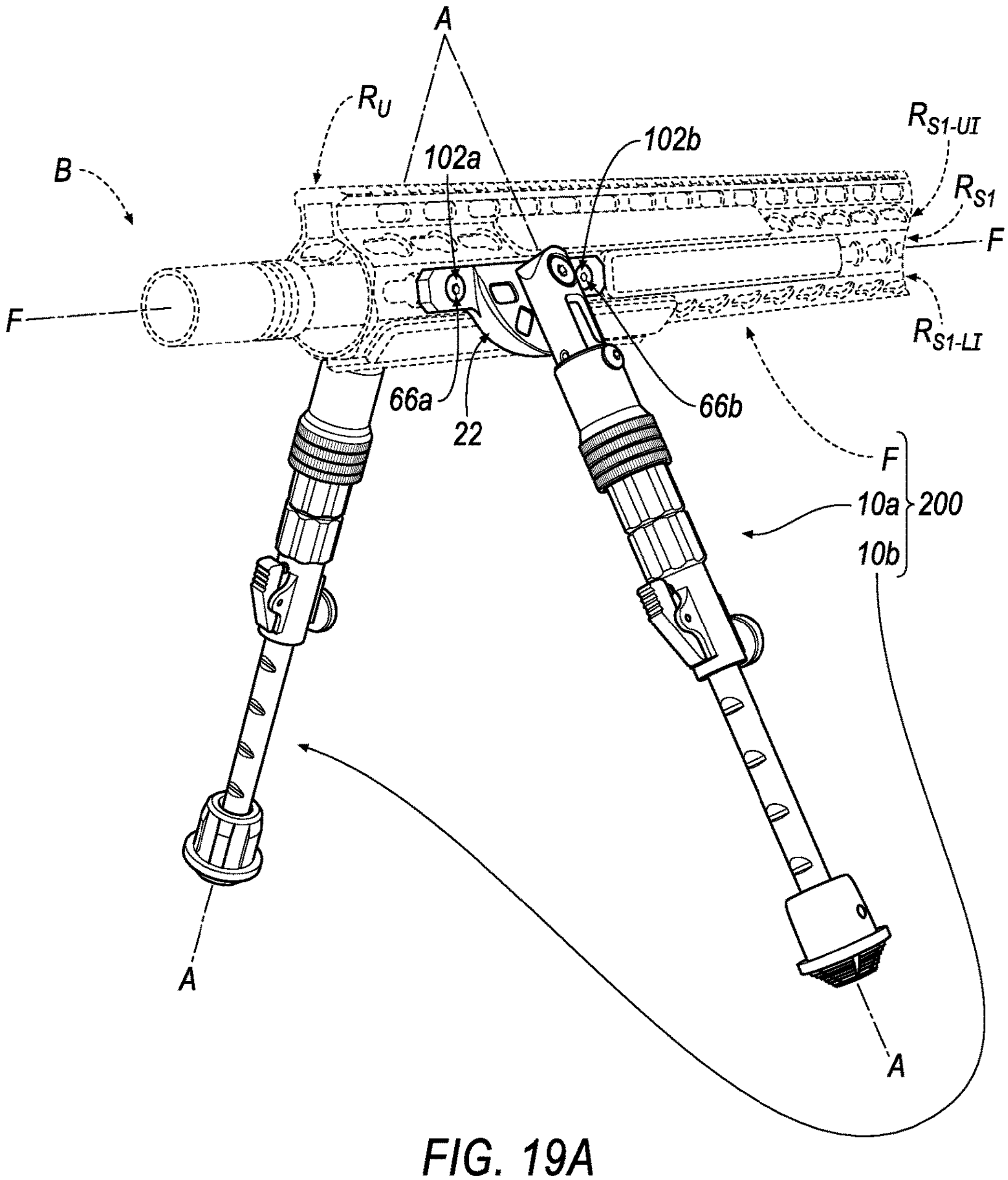
FIG. 19A is an isometric view of an exemplary firearm implement system including an exemplary first pod assembly attached to a first mounting rail of a firearm and an exemplary second pod assembly attached to a second mounting rail of a firearm.
Figure 19B:
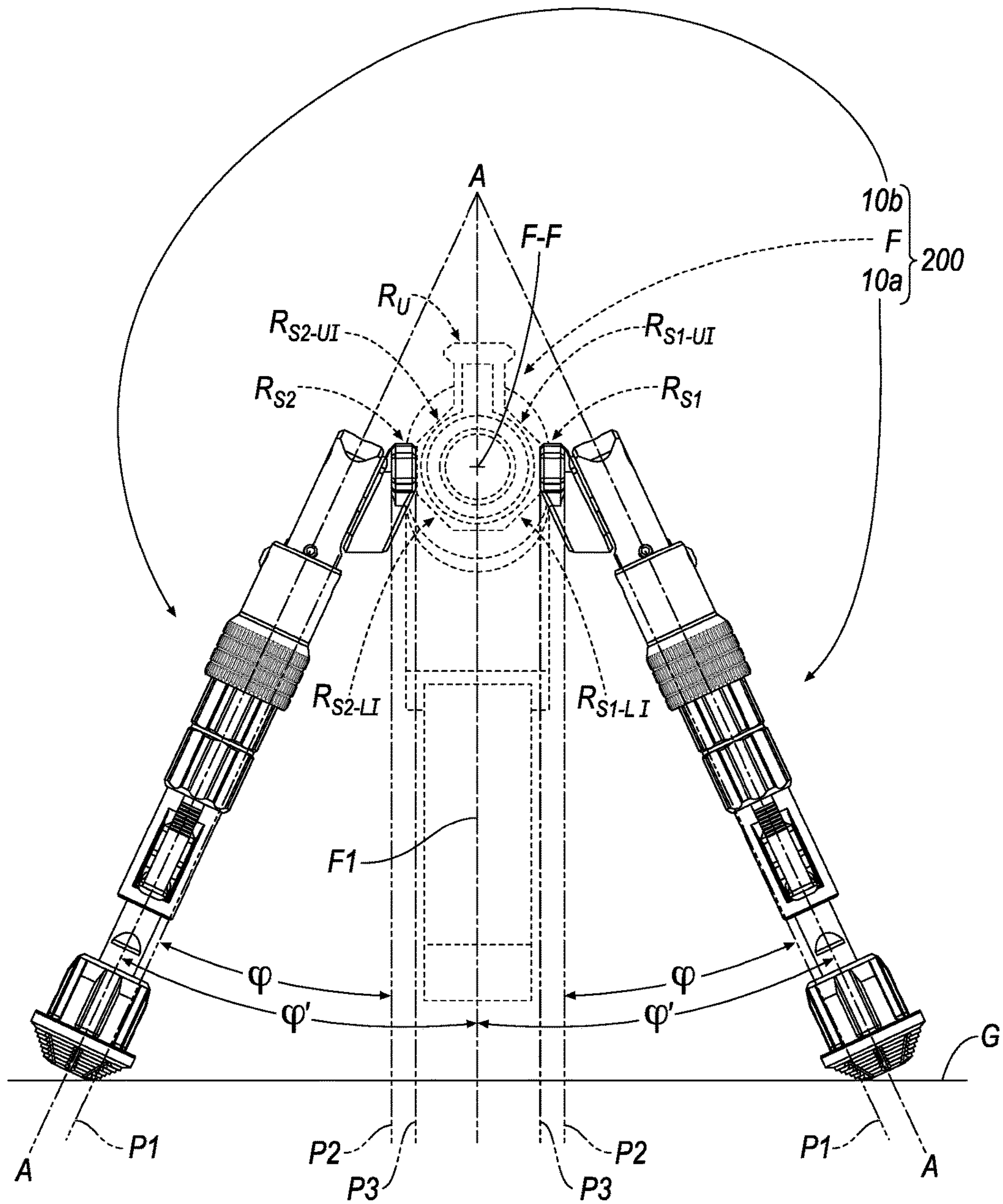
FIG. 19B is a front view of the firearm implement system of FIG. 19A.

Referring to FIGS. 1A-1C, 14A-14D and 15A-15D, a pod assembly is shown generally at 10. Furthermore, as seen in FIGS. 18A-18B, a firearm implement system including a pod assembly 10*a* and a firearm F is shown generally at 100. Yet even further, as seen in FIGS. 19A-19B, a firearm implement system including a first pod assembly 10*a*, a second pod assembly 10*b* and a firearm F is shown generally at 200. The pod assembly 10*a* of the firearm implement system 100 and the first and second pod assemblies 10*a*, 10*b* of the firearm implement system 200 may be substantially similar to the pod assembly 10 of FIGS. 1A-1C, 14A-14D and 15A-15D.

Figure 1B:
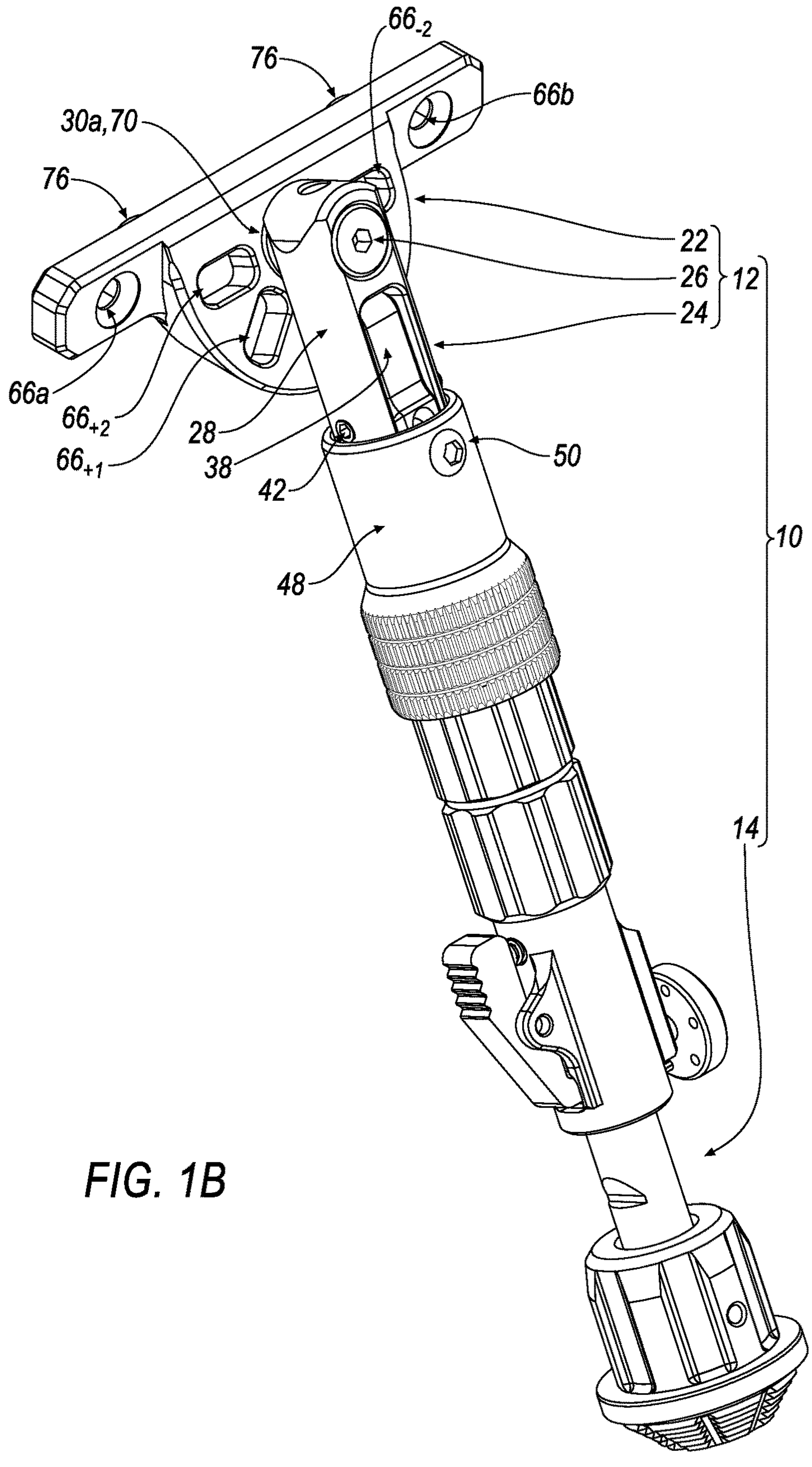
FIG. 1B is a front assembled isometric view of the pod assembly of FIG. 1A.
Figure 1C:
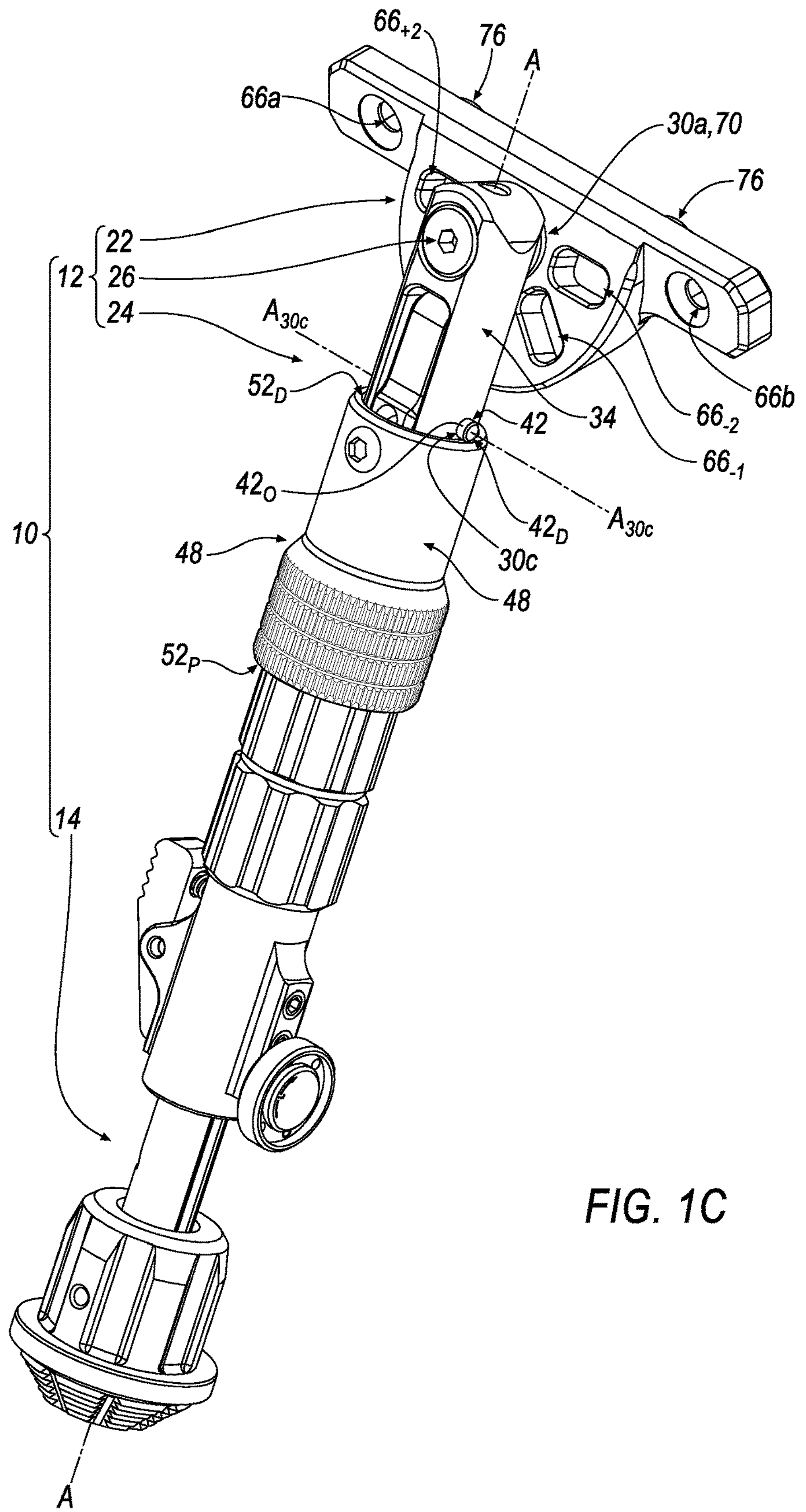
FIG. 1C is a rear assembled isometric view of the pod assembly of FIG. 1A.

Referring to FIGS. 1A-1C, the pod assembly 10 includes a leg indexing portion 12. The pod assembly 10 may optionally include a telescoping leg portion 14 connected to the leg indexing portion 12; because the leg indexing portion 12 can, in-of-itself, is shaped to be in the form of a leg or a support member for supporting a device (such as, e.g., a camera, firearm (F, as seen in, for example, FIGS. 18A-18B, 19A-19B) or the like), the telescoping leg portion 14 may operate to extend the leg shape of the leg indexing portion 12, and, as a result, the telescoping leg portion 14 is not a critical or essential component of the pod assembly 10.

As seen in FIG. 1A, the telescoping leg portion 14 includes a shaft portion 16. At least a distal portion 16D of the shaft portion 16 is adjustably-disposed within the leg indexing portion 12 (see, e.g., FIGS. 15A-15D). In an implementation, the shaft portion 16 is movably-disposed relative to the leg indexing portion 12 along an axis A-A that coaxially extends through both of the leg indexing portion 12 and the telescoping leg portion 14.

The telescoping leg portion 14 may further include a foot portion 18 that is attached to a proximal portion $\mathbf{16}_P$ of the shaft portion 16. The telescoping leg portion 14 may further include a retainer portion 20 that selectively-retains the shaft portion 16 in a selectively-fixed orientation relative the leg indexing portion 12 after the shaft portion 16 has been selectively extended from the leg indexing portion 12 or selectively disposed within the leg indexing portion 12.

Referring to FIGS. 1A-1C, the leg indexing portion 12 includes an indexing plate 22 and a biased latch subassembly 24. The leg indexing portion 12 further includes a pivot pin 26 that pivotably-connects (see, e.g., arrows P/P' in FIGS. 14A-14D) the biased latch subassembly 24 to the indexing plate 22.

Figure 2:
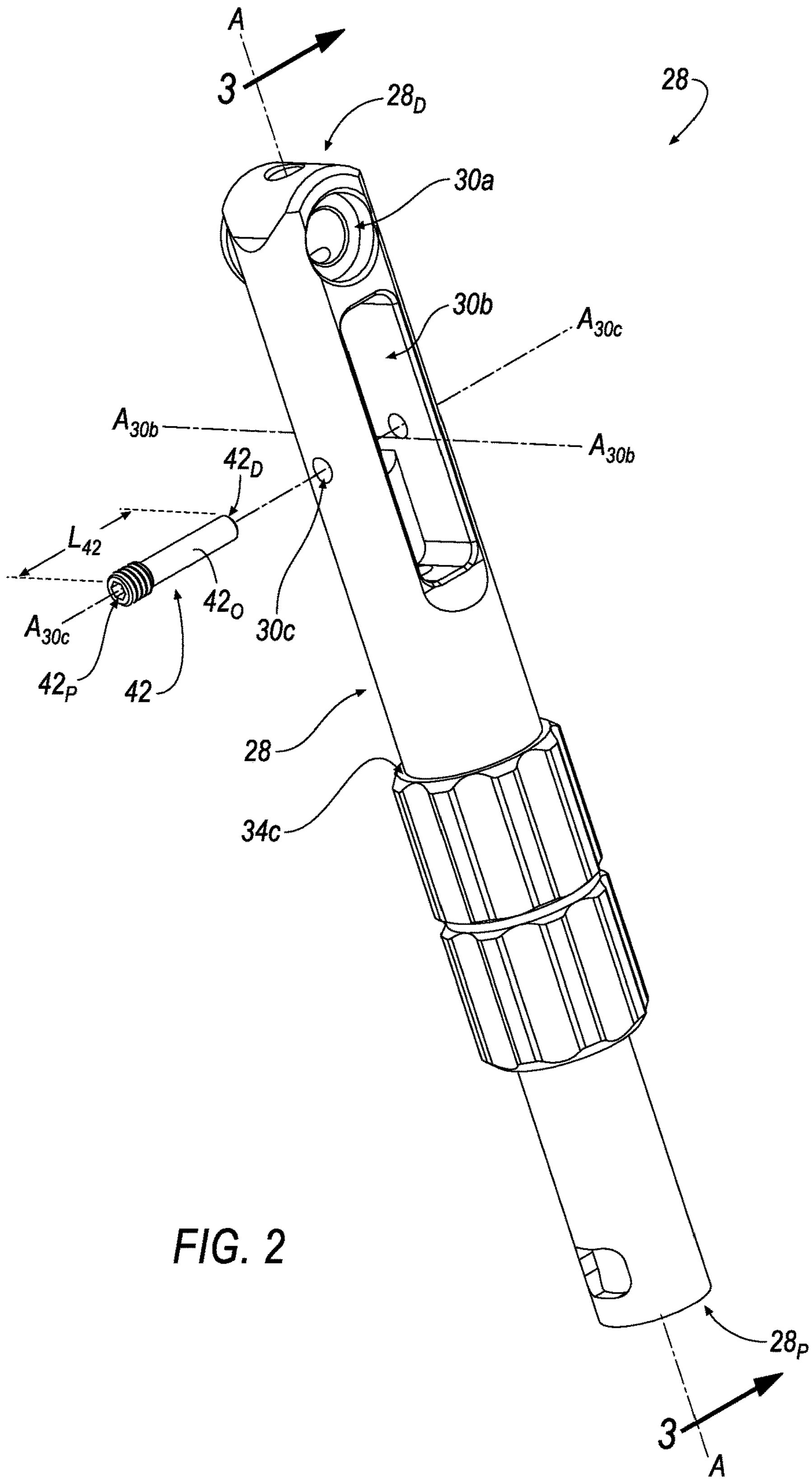
FIG. 2 is an isometric view of an exemplary shaft body and an exemplary latch pin of an exemplary biased latch subassembly.
Figure 3:
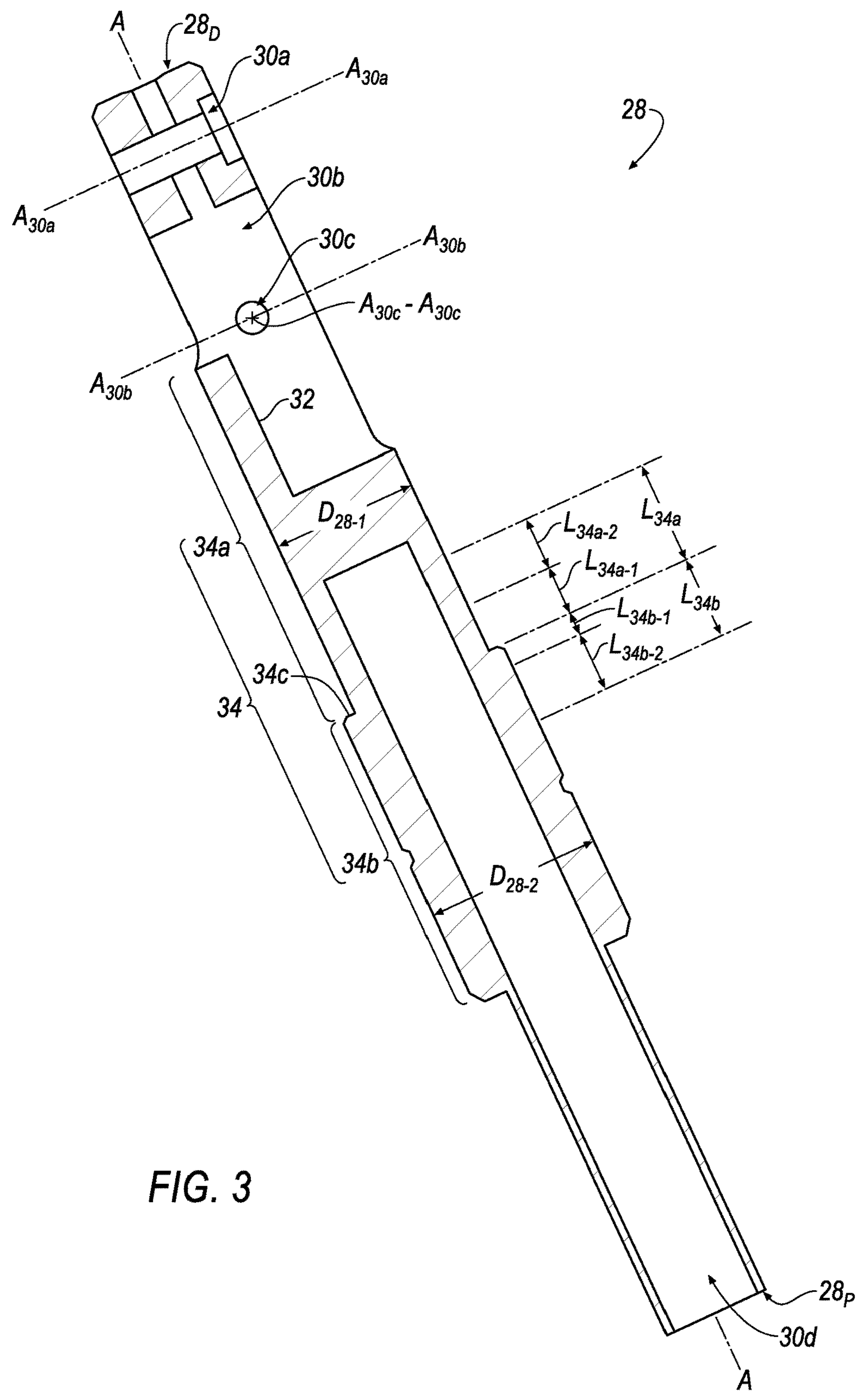
FIG. 3 is a cross-sectional view of the shaft body according to line 3-3 of FIG. 2.

With reference to FIGS. 1A-1C, 2 and 3, the biased latch subassembly 24 includes a shaft body 28. With reference to FIGS. 1A and 2-3, the shaft body 28 defines: a pivot-pin-receiving passage 30*a*, a rocker-latch-receiving passage 30*b*, at least one (e.g. a pair of) latch pin-receiving passage(s) 30*c* and a telescoping-leg-portion-receiving passage 30*d* (see, e.g., FIG. 3).

Referring to FIG. 3, the pivot-pin-receiving passage 30*a* radially extends through the shaft body 28 (relative to the axis A-A) proximate a distal end $\mathbf{28}_D$ of the shaft body 28. The rocker-latch-receiving passage 30*b* radially extends (see, e.g., axis $A_{30b}$-$A_{30b}$) through the shaft body 28 (relative to the axis A-A) proximate the distal end $\mathbf{28}_D$ of the shaft body 28 but nearer to a proximal end $\mathbf{28}_P$ of the shaft body 28 with respect to the pivot-pin-receiving passage 30*a*.

With further reference to FIG. 3, the pair of latch pin-receiving passages 30*c* radially extends (see, e.g., axis $A_{30c}$-$A_{30c}$) through the shaft body 28 (relative to the axis A-A) proximate the distal end $\mathbf{28}_D$ of the shaft body 28 but nearer to the proximal end $\mathbf{28}_P$ of the shaft body 28 with respect to the pivot-pin-receiving passage 30*a*. Furthermore, as seen in FIGS. 1A, 2 and 3, the pair of latch pin-receiving passages 30*c* radially traverses and is in fluid communication with the rocker-latch-receiving passage 30*b*. The pair of latch pin-receiving passages 30*c* are radially offset from the rocker-latch-receiving passage 30*b* by approximately 180° (see, e.g., axis $A_{30c}$-$A_{30c}$ extending through the pair of latch pin-receiving passages 30*c* compared to axis $A_{30b}$-$A_{30b}$ extending through the rocker-latch-receiving passage 30*b*).

As seen in FIG. 3, the telescoping-leg-portion-receiving passage 30*d* partially axially extends into the shaft body 28 from the proximal end $\mathbf{28}_P$ of the shaft body 28 along the axis A-A. Furthermore, the telescoping-leg-portion-receiving passage 30*d* extends toward but not all the way to the distal end $\mathbf{28}_D$ of the shaft body 28. Yet even further, the telescoping-leg-portion-receiving passage 30*d* extends toward the distal end $\mathbf{28}_D$ of the shaft body 28 but not past the rocker-latch-receiving passage 30*b*, which is nearest to the proximal end $\mathbf{28}_P$ of the shaft body 28 with respect to the pivot-pin-receiving passage 30*a* and the pair of latch pin-receiving passages 30*c*.

With continued reference to FIG. 3, the rocker-latch-receiving passage 30*b* may be defined an inner surface 32. The inner surface 32 of the rocker-latch-receiving passage 30*b* may be alternatively referred to as a radial biasing member engagement surface.

As seen in FIG. 3, the shaft body 28 may be further defined by an outer surface portion 34. In an example, the outer surface portion 34 may be defined by at least: a first axial surface portion 34*a*, a second axial surface portion 34*b* and a radial surface portion 34*c* that connects the first axial surface portion 34*a* to the second axial surface portion 34*b*. The radial surface portion 34*c* may be alternatively referred to as an axial biasing member engagement surface.

Some of a length of the first axial surface portion 34*a* may be defined by a length portion $L_{34a}$ including a first length portion segment $L_{34a-1}$ that extends axially away from the axial biasing member engagement surface 34*c* and a second length portion segment $L_{34a-2}$ that extends axially away from the first length portion segment $L_{34a-1}$. Some of a length of the second axial surface portion 34*b* may be defined by a length portion $L_{34b}$ including a first length portion segment $L_{34b-1}$ that extends axially away from the axial biasing member engagement surface 34*c* and a second length portion segment $L_{34b-2}$ that extends axially away from the first length portion segment $L_{34b-1}$.

At least some of the first axial surface portion 34*a* of the outer surface portion 34 may define a first outer diameter $D_{28-1}$ of the shaft body 28. At least some of the second axial surface portion 34*b* of the outer surface portion 34 may define a second outer diameter $D_{28-2}$ of the shaft body 28. The second outer diameter $D_{28-2}$ may be greater than the first outer diameter $D_{28-1}$.

Figure 4:
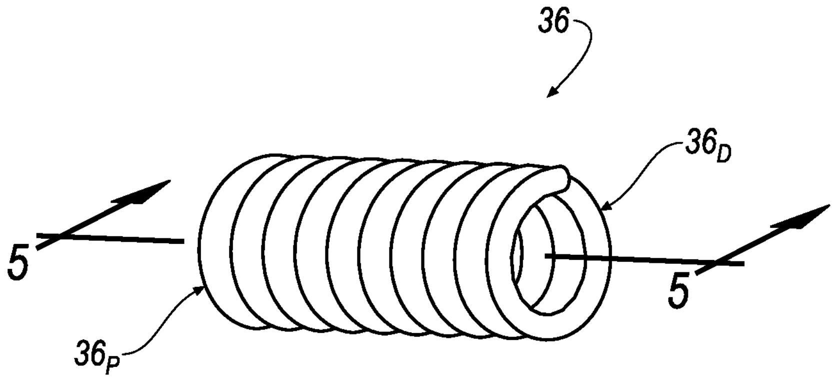
FIG. 4 is an isometric view of an exemplary radial biasing member of an exemplary biased latch subassembly.
Figure 5:
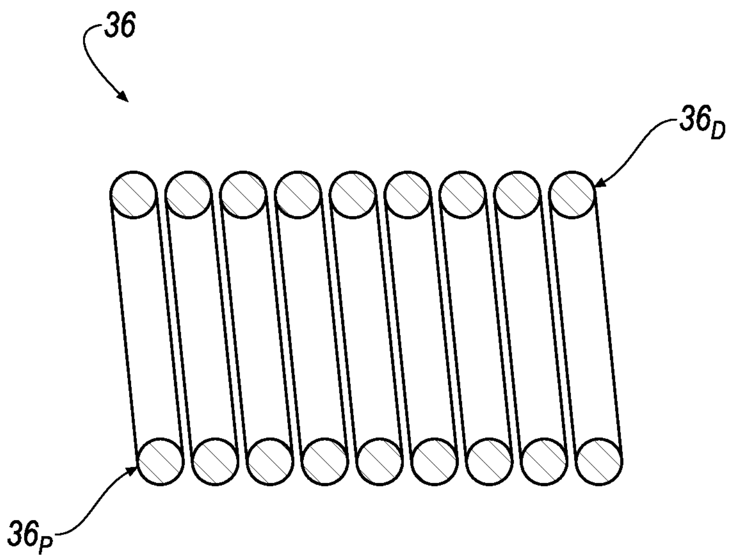
FIG. 5 is a cross-sectional view of the radial biasing member according to line 4-4 of FIG. 4.
Figure 6:
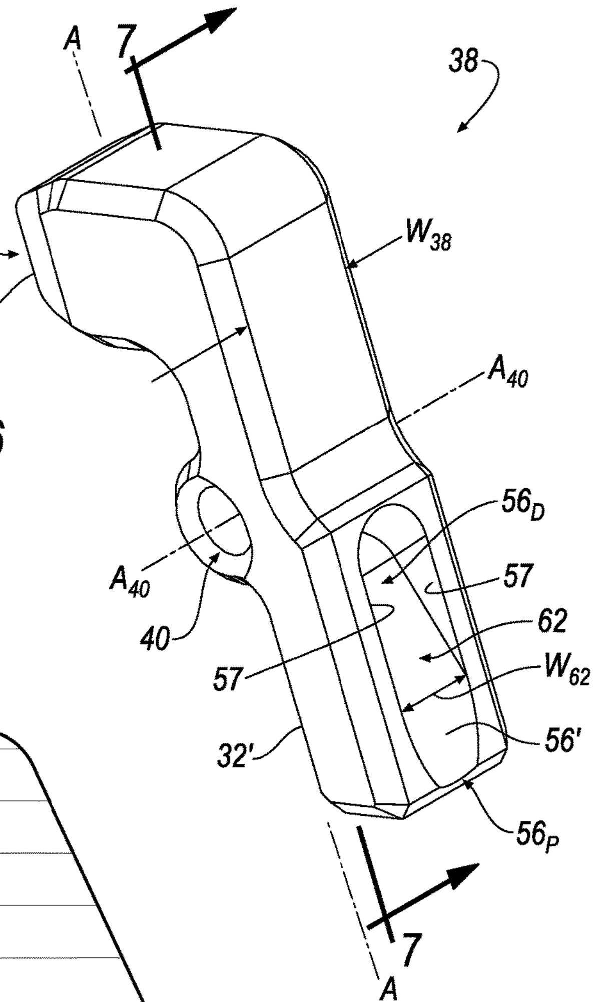
FIG. 6 is an isometric view of an exemplary rocker latch of an exemplary biased latch subassembly.
Figure 7:
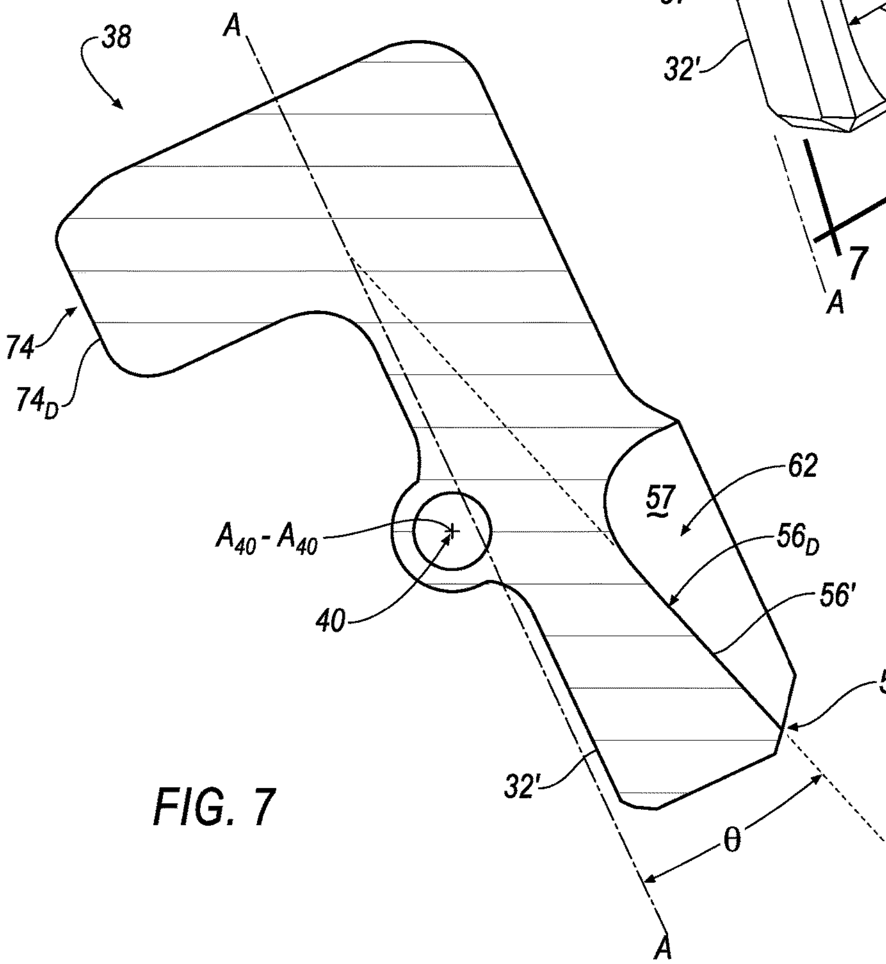
FIG. 7 is a cross-sectional view of the rocker latch according to line 7-7 of FIG. 6.

With reference to FIGS. 1A, 4-5 and 6-7, the biased latch subassembly 24 further includes a radial biasing member 36 (see, e.g., FIGS. 4-5) and a rocker latch 38 (see, e.g., FIGS. 6-7). The radial biasing member 36 and the rocker latch 38 are disposed within the rocker-latch-receiving passage 30*b* of the shaft body 28 (see, e.g., FIGS. 15A-15D).

Referring to FIGS. 4-5, the radial biasing member 36 may be a coil spring. The radial biasing member 36 may be defined by a proximal end $\mathbf{36}_P$ and a distal end $\mathbf{36}_D$.

Referring to FIGS. 6-7, the rocker latch 38 may define a latch pin-receiving passage 40 extending through a width $W_{38}$ (see, e.g., FIG. 6) of the rocker latch 38. An axis $A_{40}$-$A_{40}$ (see, e.g., FIG. 6) extends through the latch pin-receiving passage 40 of the rocker latch 38. Upon disposing the rocker latch 38 within the rocker-latch-receiving passage 30*b* (see, e.g., FIG. 15A-15D), the axis $A_{40}$-$A_{40}$ extending through the latch pin-receiving passage 40 of the rocker latch 38 is co-axially aligned with the axis $A_{30c}$-$A_{30c}$ extending through the pair of latch pin-receiving passages 30*c* of the shaft body 28.

Referring to FIGS. 1A and 2, the biased latch subassembly 24 further includes a latch pin 42. As seen in FIG. 1A, the latch pin 42 is aligned with the axis $A_{30c}$-$A_{30c}$ (see also, e.g., FIG. 2) extending through the pair of latch pin-receiving passages 30*c* of the shaft body 28 and the axis $A_{40}$-$A_{40}$ extending through the latch pin-receiving passage 40 of the rocker latch 38. The latch pin 42 is disposed within is the pair of latch pin-receiving passages 30*c* of the shaft body 28 and the latch pin-receiving passage 40 of the rocker latch 38 (as seen in FIGS. 1B-1C) for rotatably-connecting R (see, e.g., FIG. 15B)/R' (see, e.g., FIG. 15D) the rocker latch 38 to the shaft body 28.

As seen in FIGS. 1A and 2, the latch pin 42 includes a proximal end $\mathbf{42}_P$ and a distal end $\mathbf{42}_D$. The latch pin 42 is defined by a length $L_{42}$ extending between the proximal end $\mathbf{42}_P$ of the latch pin 42 and the distal end $\mathbf{42}_D$ of the latch pin 42. The length $L_{42}$ of latch pin 42 may be greater than the first outer diameter $D_{28-1}$ defined by the first axial surface portion 34*a* of the shaft body 28 such that when the latch pin 42 is disposed within the pair of latch pin-receiving passages 30*c* of the shaft body 28, at least, for example the distal end $\mathbf{42}_D$ of the latch pin 42 extends radially beyond the outer surface portion 34 of the shaft body 28 (as seen in, e.g., FIG. 1C) in order to permit a distal end $\mathbf{52}_D$ of a sleeve body 52 of a latch actuator pull sleeve 48 to be biased into and disposed adjacent an outer surface portion $\mathbf{42}_O$ (see also, e.g., FIGS. 1A, 1C and 2) of the latch pin 42.

With reference to FIGS. 15A-15D, prior to rotatably-securing R/R' the rocker latch 38 to the shaft body 28 by way of the latch pin 42 as described above, the radial biasing member 36 is arranged within the rocker-latch-receiving passage 30*b* of the shaft body 28. In an example, the radial biasing member 36 is arranged between the radial biasing member engagement surface 32 of the rocker-latch-receiving passage 30*b* and a radial-outwardly-urging surface 32' (see also, e.g., FIG. 7) of the rocker latch 38 such that the proximal end $\mathbf{36}_P$ of radial biasing member 36 is disposed adjacent the radial biasing member engagement surface 32 of the rocker-latch-receiving passage 30*b* and the distal end $\mathbf{36}_D$ of radial biasing member 36 is disposed adjacent the radial-outwardly-urging surface 32' of the rocker latch 38.

As seen in FIGS. 1A, 3 and 15A-15D, the shaft portion 16 of the telescoping leg portion 14 is aligned with the axis A-A extending through the telescoping-leg-portion-receiving passage 30*d* of the shaft body 28 of the leg indexing portion 12. Furthermore, as seen in FIGS. 15A-15D, the shaft portion 16 of the telescoping leg portion 14 is disposed within the telescoping-leg-portion-receiving passage 30*d* of the shaft body 28 of the leg indexing portion 12 for telescopingly-connecting the shaft portion 16 of the telescoping leg portion 14 to the shaft body 28 of the leg indexing portion 12. The shaft portion 16 of the telescoping leg portion 14 may be slidably-adjusted into and out of the telescoping-leg-portion-receiving passage 30*d* of the shaft body 28 of the leg indexing portion 12 and selectively-fixed in any desirable retracted or extended position by engaging or disengaging the retainer portion 20 of the telescoping leg portion 14.

Figure 8:
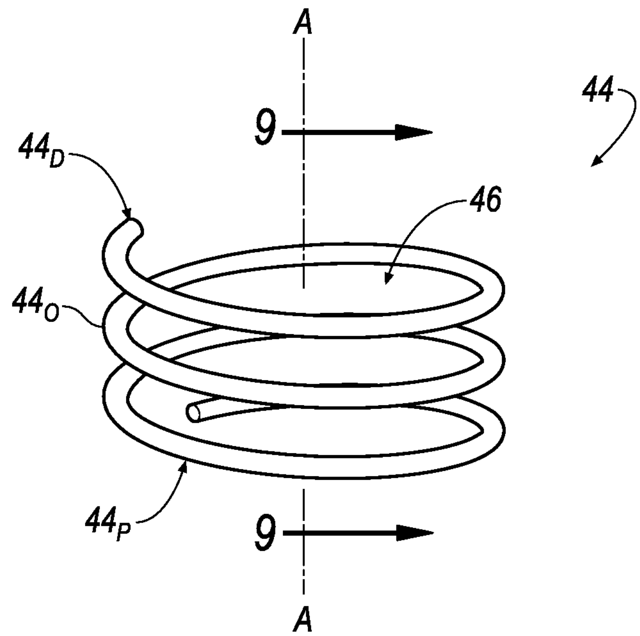
FIG. 8 is an isometric view of an exemplary axial biasing member of an exemplary biased latch subassembly.
Figure 9:
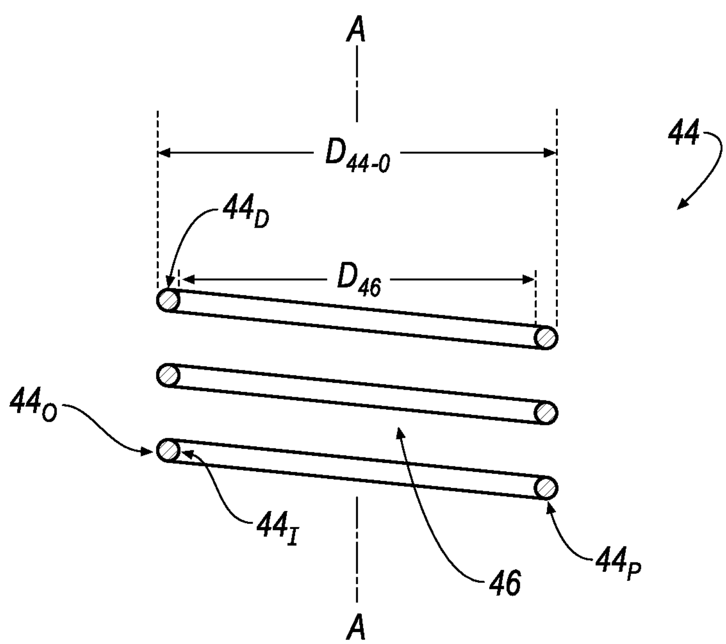
FIG. 9 is a cross-sectional view of the axial biasing member according to line 9-9 of FIG. 8.
Figure 10:
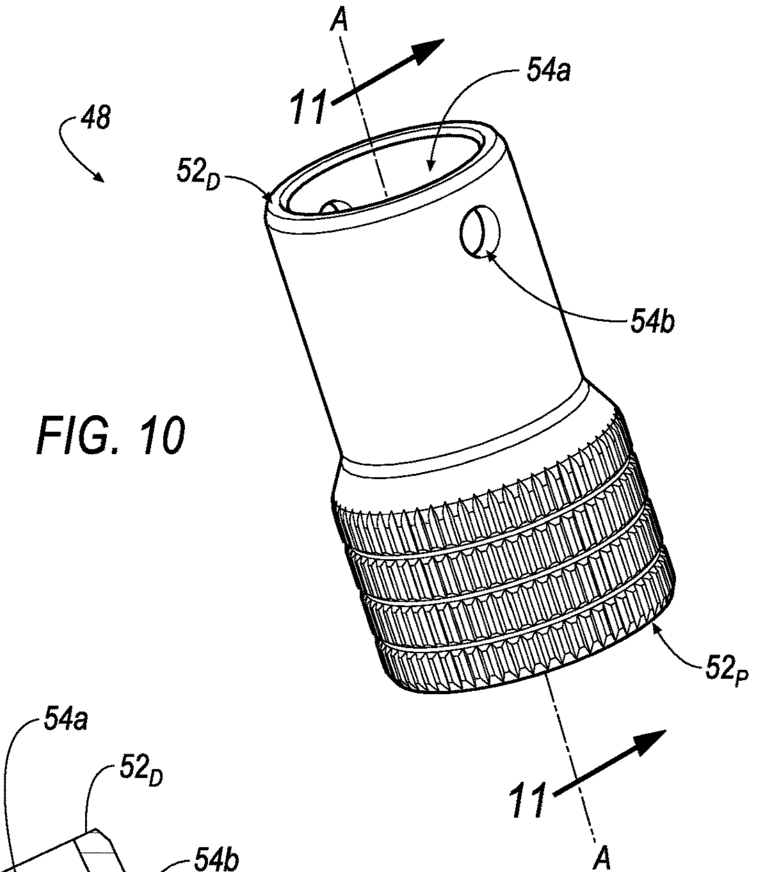
FIG. 10 is an isometric view of an exemplary latch actuator pull sleeve of an exemplary biased latch subassembly.

With reference to FIGS. 1A and 8-9, the biased latch subassembly 24 further includes an axial biasing member 44. In an example, the axial biasing member 44 may be a coil spring having a proximal surface $\mathbf{44}_P$, a distal surface $\mathbf{44}_D$, an inner surface $\mathbf{44}_I$ (see, e.g., FIG. 9) and an outer surface $\mathbf{44}_O$. The inner surface $\mathbf{44}_I$ of the axial biasing member 44 defines a passage 46 extending through the axial biasing member 44 between the proximal surface $\mathbf{44}_P$ and the distal surface $\mathbf{44}_D$. The inner surface $\mathbf{44}_I$ of the axial biasing member 44 also defines a passage diameter $D_{46}$ of the passage 46. The outer surface $\mathbf{44}_O$ of the axial biasing member 44 defines an outer diameter $D_{44\text{-}O}$ of the axial biasing member 44.

With reference to FIGS. 3, 9 and 15A-15D, in an example, the passage diameter $D_{46}$ of the passage 46 of the axial biasing member 44 is approximately equal to but slightly greater than the first outer diameter $D_{28\text{-}1}$ defined by the first axial surface portion 34*a* of the outer surface portion 34 of the shaft body 28; furthermore, the outer diameter $D_{44\text{-}O}$ of the axial biasing member 44 is approximately equal to but slightly less than the second outer diameter $D_{28\text{-}2}$ defined by the second axial surface portion 34*b* of the outer surface portion 34 of the shaft body 28. As a result of the exemplary corresponding dimensions described above, as seen in FIG. 1A, the axial biasing member 44 is co-axially aligned with the axis A-A, and the proximal surface $\mathbf{44}_P$ of the axial biasing member 44 is arranged opposite the axial biasing member engagement surface 34*c* of the outer surface portion 34 of the shaft body 28. Thereafter, as seen in FIGS. 15A-15D, the distal end $\mathbf{28}_D$ of the shaft body 28 is inserted through passage 46 of the axial biasing member 44 such that the inner surface $\mathbf{44}_I$ of the axial biasing member 44 is arranged opposite some of the first axial surface portion 34*a* of the outer surface portion 34 of the shaft body 28 and the proximal surface $\mathbf{44}_P$ of the axial biasing member 44 is arranged adjacent and supported by the axial biasing member engagement surface 34*c* of the outer surface portion 34 of the shaft body 28.

Figure 11:
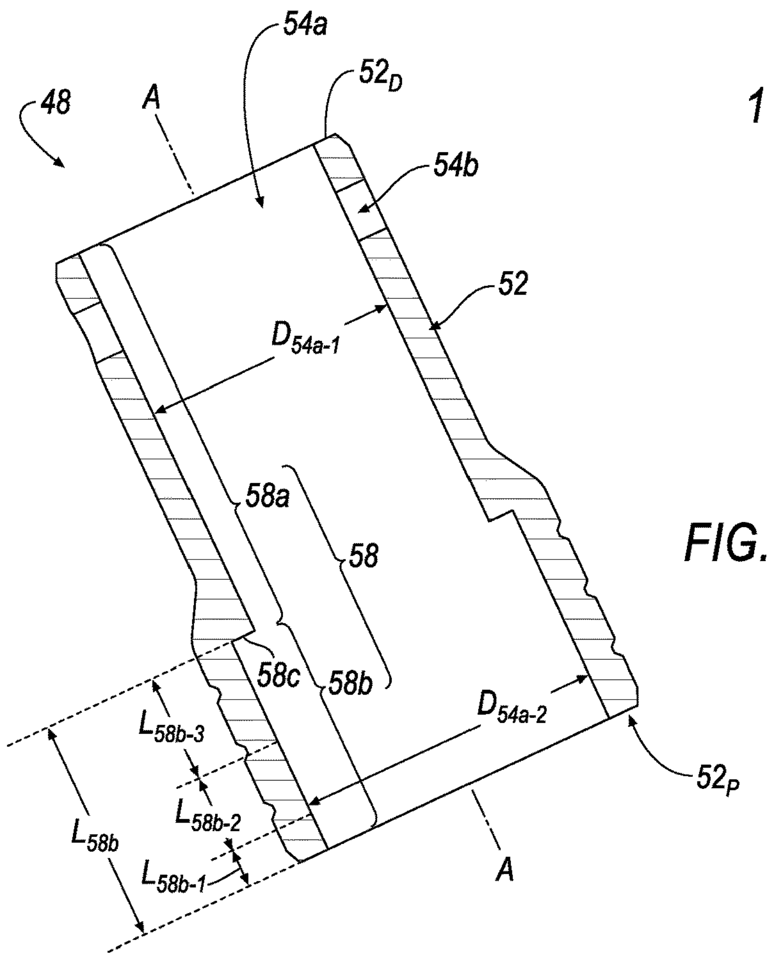
FIG. 11 is a cross-sectional view of the latch actuator pull sleeve according to line 11-11 of FIG. 10.
Figure 12:
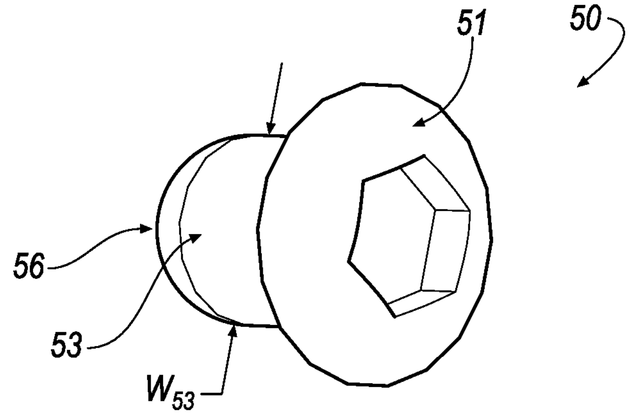
FIG. 12 is an isometric view of an exemplary rocker latch-engaging finger of an exemplary biased latch subassembly.
Figure 13:
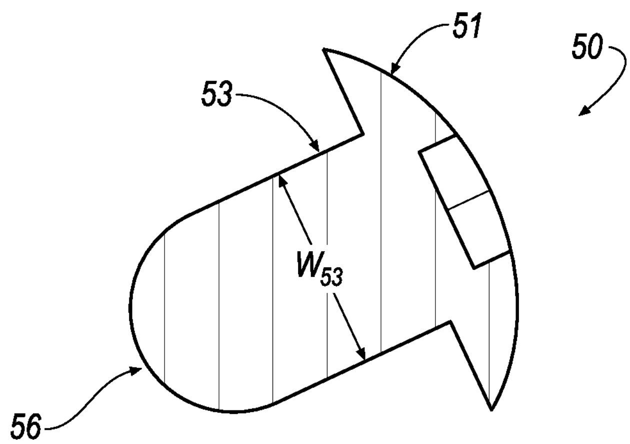
FIG. 13 is a cross-sectional view of the rocker latch-engaging finger according to line 13-13 of FIG. 12.
Figure 14A:
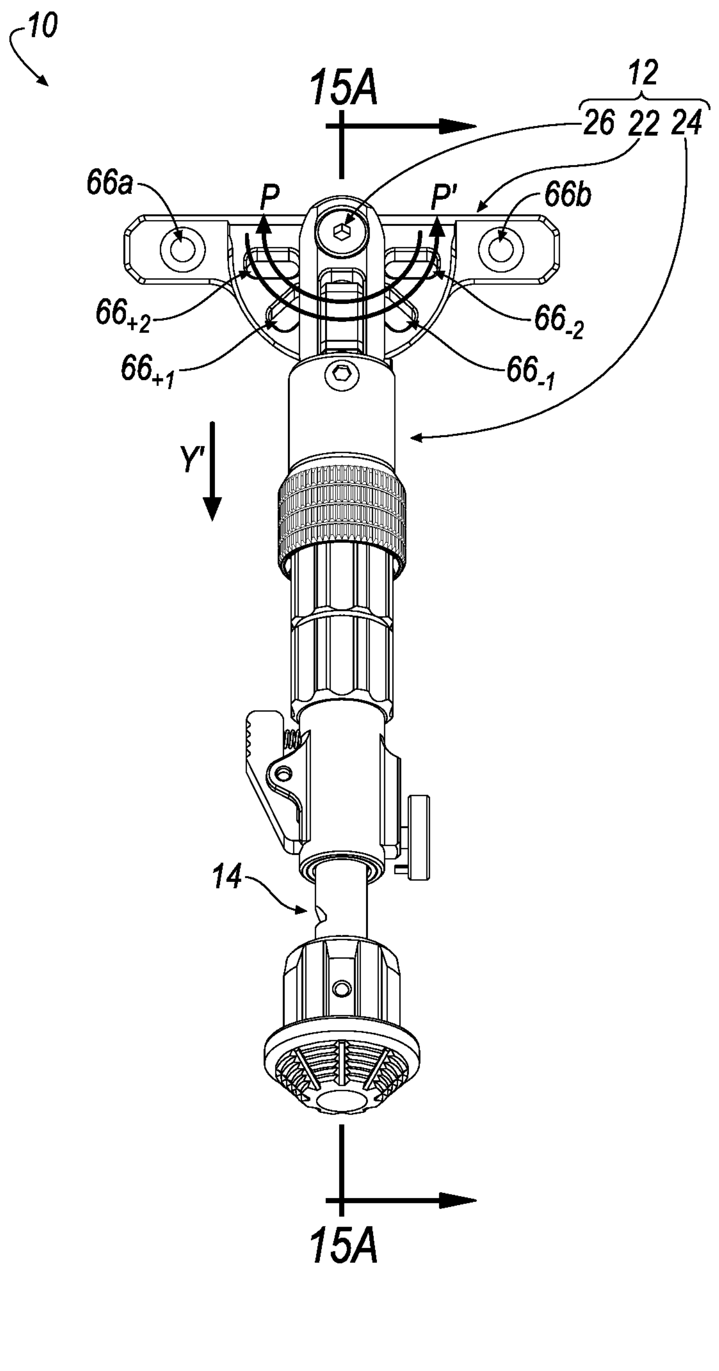
FIG. 14A is a side isometric view of the pod assembly of FIGS. 1A-1C showing an exemplary biased latch subassembly of the pod assembly arranged relative an exemplary indexing plate of the pod assembly in a latched, neutral orientation.
Figure 14B:
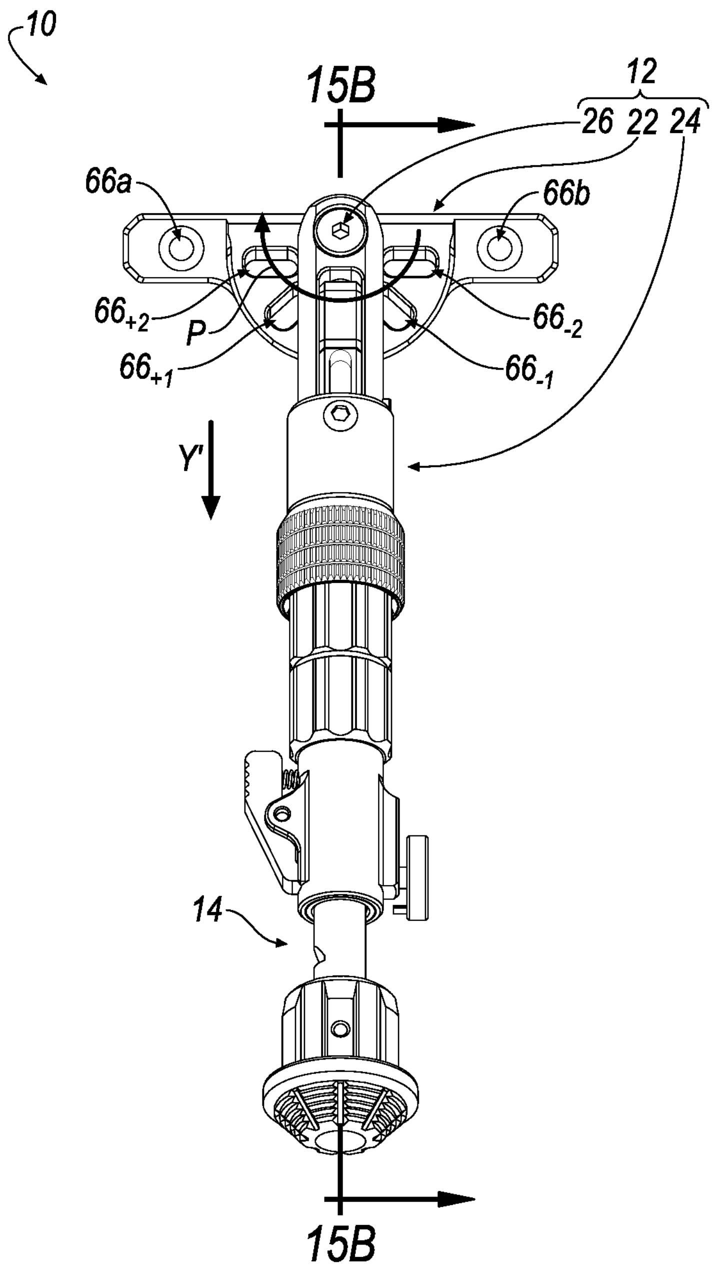
FIG. 14B is a side isometric view of the pod assembly of FIGS. 1A-1C showing an exemplary biased latch subassembly of the pod assembly arranged relative an exemplary indexing plate of the pod assembly in an unlatched, neutral orientation.
Figure 14C:
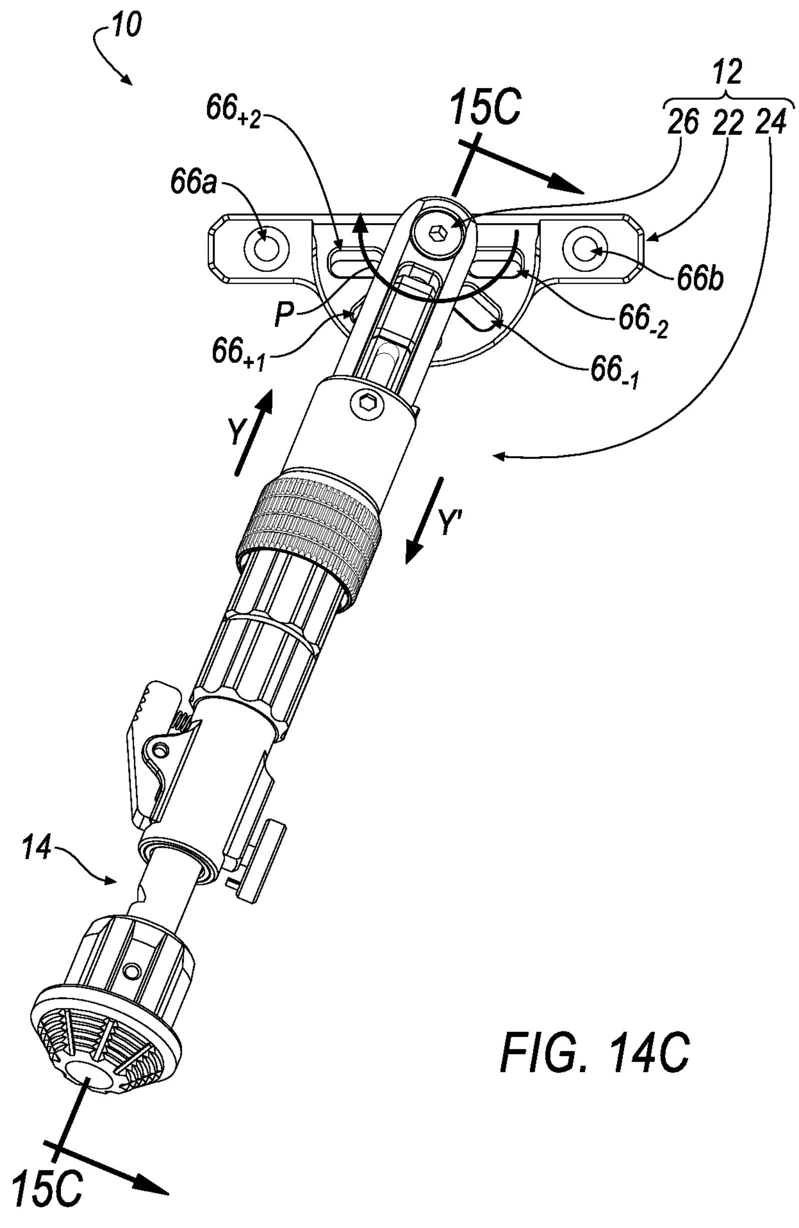
FIG. 14C is a side isometric view of the pod assembly of FIGS. 1A-1C showing an exemplary biased latch subassembly of the pod assembly arranged relative an exemplary indexing plate of the pod assembly in an unlatched, pivoted-from-neutral orientation.
Figure 14D:
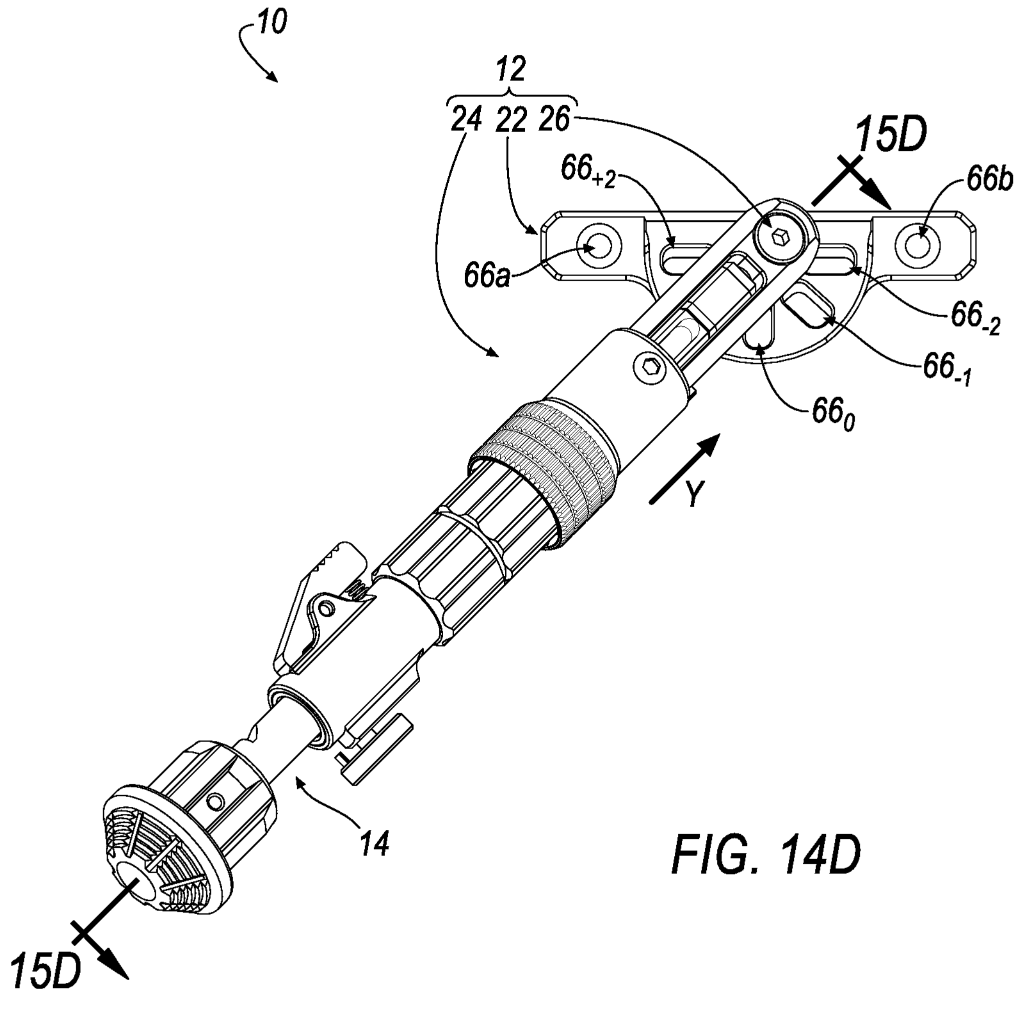
FIG. 14D is a side isometric view of the pod assembly of FIGS. 1A-1C showing an exemplary biased latch subassembly of the pod assembly arranged relative an exemplary indexing plate of the pod assembly in a latched, pivoted-from-neutral orientation.

With reference to FIGS. 1A, 10-11 and 12-13, the biased latch subassembly 24 further includes a latch actuator pull sleeve 48 (see, e.g., FIGS. 10-11) and rocker latch-engaging finger 50 (see, e.g., FIGS. 12-13). The rocker latch-engaging finger 50 includes a head portion 51 and a stem portion 53. Referring to FIG. 11, the latch actuator pull sleeve 48 includes a sleeve body 52 defining an axial passage 54*a* and a radial passage 54*b* that is in fluid communication with the axial passage 54*a*; furthermore, as seen in FIGS. 15A-15D, the radial passage 54*b* is also in fluid communication with the rocker-latch-receiving passage 30*b* when the latch actuator pull sleeve 48 is arranged about the shaft body 28.

As seen in FIGS. 15A-15D, the shaft body 28 is arranged within the axial passage 54*a* and a portion of the stem portion 53 rocker latch-engaging finger 50 extends through the radial passage 54*b* and into the rocker-latch-receiving passage 30*b* of the shaft body 28 as a result of the latch actuator pull sleeve 48 circumscribing a portion of the rocker-latch-receiving passage 30*b* of the shaft body 28. Furthermore, a portion of the length of the latch actuator pull sleeve 48 including the radial passage 54*b* that retains the portion of the stem portion 53 of the rocker latch-engaging finger 50 circumscribes a portion of the rocker-latch-receiving passage 30*b* of the shaft body 28 such that a rocker-latch-engaging surface 56 (see also, e.g., FIGS. 12-13) of the stem portion 53 of the rocker latch-engaging finger 50 is permitted to be disposed adjacent and slidably-engage a radial-inwardly-urging surface 56' (see also, e.g., FIG. 7) of the rocker latch 38. The radial-inwardly-urging surface 56' is generally defined as having a proximal end $\mathbf{56}_P$ (see, e.g., FIGS. 6-7) and a distal end $\mathbf{56}_D$ (see, e.g., FIGS. 6-7).

Referring to FIG. 11, the sleeve body 52 may be further defined by an inner surface 58 that defines the axial passage 54*a*. In an example, the inner surface 58 may be defined by at least: a first axial surface portion 58*a*, a second axial surface portion 58*b* and a radial surface portion 58*c* that connects the first axial surface portion 58*a* to the second axial surface portion 58*b*. The radial surface portion 58*c* may be alternatively referred to as an axial biasing member urging surface.

The second axial surface portion 58*b* may be defined by a length portion $L_{58b}$ including a first length portion segment $L_{58b\text{-}1}$, a second length portion segment $L_{58b\text{-}2}$ and a third length portion segment $L_{58b\text{-}3}$. The first length portion segment $L_{58b\text{-}1}$ extends axially away from a proximal end $\mathbf{52}_P$ of the sleeve body 52. The second length portion segment $L_{58b\text{-}2}$ extends axially away from the first length portion segment $L_{58b\text{-}1}$ and is arranged axially between the first length portion segment $L_{58b\text{-}1}$ and the third length portion segment $L_{58b\text{-}3}$. The third length portion segment $L_{58b\text{-}3}$ extends axially away from the second length portion segment $L_{58b\text{-}2}$ and is arranged axially between the second length portion segment $L_{58b\text{-}2}$ and the axial biasing member urging surface 58*c*.

The first axial surface portion 58*a* of the inner surface 58 may define a first passage diameter $D_{54a\text{-}1}$ of the axial passage 54*a*. The second axial surface portion 58*b* of the inner surface 58 may define a second passage diameter $D_{54a\text{-}2}$ of the axial passage 54*a*. The second passage diameter $D_{54a\text{-}2}$ may be greater than the first passage diameter $D_{54a\text{-}1}$.

With reference to FIGS. 3 and 11, in an example, the first passage diameter $D_{54a\text{-}1}$ of the axial passage 54*a* defined by the inner surface 58 of the sleeve body 52 is approximately equal to but slightly greater than the first outer diameter $D_{28\text{-}1}$ defined by the first axial surface portion 34*a* of the shaft body 28. Furthermore, the second passage diameter $D_{54a\text{-}2}$ of the axial passage 54*a* defined by the inner surface 58 of the sleeve body 52 is approximately equal to but slightly greater than the second outer diameter $D_{28\text{-}2}$ defined by the second axial surface portion 34*b* of the shaft body 28.

As seen in FIGS. 1A and 15A-15D, as a result of the exemplary corresponding dimensions described above, the latch actuator pull sleeve 48 is aligned with the axis A-A, and the axial biasing member urging surface 58*c* of the inner surface 58 of the sleeve body 52 of the latch actuator pull sleeve 48 is arranged opposite the distal surface $\mathbf{44}_D$ of the axial biasing member 44. Thereafter, with reference to FIGS. 3, 11 and 15A-15D, the distal end $\mathbf{28}_D$ of the shaft body 28 is inserted through axial passage 54*a* defined by the inner surface 58 of the sleeve body 52 of the latch actuator pull sleeve 48 for arranging the inner surface 58 of the sleeve body 52 about the outer surface portion 34 of the shaft body 28 such that: (1) the first length portion segment $L_{58b-1}$ of the length portion $L_{58b}$ of the second axial surface portion 58*b* of the inner surface 58 of the sleeve body 52 is arranged opposite the first length portion segment $L_{34b-1}$ of the length portion $L_{34b}$ of the second axial surface portion 34*b* of the shaft body 28, (2) the second and third length portion segments $L_{58b-2}$, $L_{58b-3}$ of the length portion $L_{58b}$ of the second axial surface portion 58*b* of the inner surface 58 of the sleeve body 52 is arranged opposite the first and second length portion segments $L_{34a-1}$, $L_{34a-2}$ of the length portion $L_{34a}$ of the first axial surface portion 34*a* of the shaft body 28, and (3) the axial biasing member urging surface 58*c* of the inner surface 58 of the sleeve body 52 of the latch actuator pull sleeve 48 is disposed adjacent the distal surface $44_D$ of the axial biasing member 44 while the proximal surface $44_P$ of the axial biasing member 44 is disposed adjacent the axial biasing member engagement surface 34*c* for axially retaining the axial biasing member 44 between the latch actuator pull sleeve 48 and the shaft body 28.

With reference to FIGS. 15A-15D, as a result of the arrangement of the latch actuator pull sleeve 48 relative the shaft body 28 and the axial biasing member 44 described above, an axial biasing member cavity 60 is defined by: (1) the second and third length portion segments $L_{58b-2}$, $L_{58b-3}$ of the length portion $L_{58b}$ of the second axial surface portion 58*b* of the inner surface 58 of the sleeve body 52 being arranged radially opposite the first and second length portion segments $L_{34a-1}$, $L_{34a-2}$ of the length portion $L_{34a}$ of the first axial surface portion 34*a* of the shaft body 28 and (2) the axial biasing member engagement surface 34*c* of the shaft body 28 being arranged axially opposite the axial biasing member urging surface 58*c* of the inner surface 58 of the sleeve body 52 of the latch actuator pull sleeve 48. The axial biasing member cavity 60 thereby provides a pair of axially opposite surfaces (see, e.g., surfaces 34*c*, 58*c*) and a pair of radially opposite surfaces (see, e.g., portions of surfaces 34*a*, 58*b*) that axially and radially retains the axial biasing member 44 between shaft body 28 and the sleeve body 52.

As seen in FIGS. 15A-15D, the latch pin 42 is disposed within is the pair of latch pin-receiving passages 30*c* of the shaft body 28 and the latch pin-receiving passage 40 of the rocker latch 38 after the sleeve body 52 has been arranged relative the shaft body 28 as described above. As a result of the axial biasing member 44 being axially retained within the axial biasing member cavity 60 as described above, the axial biasing member axially urges Y (see, e.g., FIGS. 15A-15D) a distal end $52_D$ (see also, e.g., FIG. 11) of the sleeve body 52 adjacent the outer surface $42_O$ of the latch pin 42 (as seen in FIG. 1C and referenced at a plane P42 defined by a dashed line in FIGS. 15A-15D extending across the outer surface $42_O$ of the latch pin 42) as a result of, for example, the distal end $42_D$ of the latch pin 42 extending radially beyond the outer surface portion 34 of the shaft body 28 for axially-retaining the sleeve body 52 of the latch actuator pull sleeve 48 between: (1) the outer surface $42_O$ of the latch pin 42 and the distal surface $44_D$ of the axial biasing member 44.

With reference to FIGS. 15A-15D, in conjunction with the axial bias Y imparted to the sleeve body 52 by the axial biasing member 44 as described above, the distal end $36_D$ of radial biasing member 36 is disposed adjacent the radial-outwardly-urging surface 32' of the rocker latch 38 for imparting a radially-outwardly bias X to the rocker latch 38 such that the rocker-latch-engaging surface 56 of the rocker latch-engaging finger 50 is disposed adjacent (for slidable engagement with) the radial-inwardly-urging surface 56' of the rocker latch 38. Furthermore, as also seen in FIGS. 6-7, the rocker latch 38 may define a stem portion-receiving channel 62 defined by the radial-inwardly-urging surface 56' and a pair of opposing channel sidewall surfaces 57. The stem portion 53 of the rocker latch-engaging finger 50 may be defined by a width $W_{53}$ (see, e.g., FIGS. 12-13) that is substantially similar to but less than a width $W_{62}$ (see, e.g., FIG. 6) of the stem portion-receiving channel 62; as a result of the relative widths $W_{53}$, $W_{62}$ of the stem portion 53 of the rocker latch-engaging finger 50 and the stem portion-receiving channel 62, the stem portion 53 of the rocker latch-engaging finger 50 may be slidably-retained adjacent the rocker latch 38 for slidable movement between the proximal end $56_P$ of the radial-inwardly-urging surface 56' and the distal end $56_D$ of the radial-inwardly-urging surface 56'.

As seen in FIGS. 7 and 15A-15D, the radial-inwardly-urging surface 56' of the rocker latch 38 defines a ramp surface that progressively projects radially outwardly at a ramp angle θ (see, e.g., FIG. 7) relative to the axis A-A that coaxially extends through both of the leg indexing portion 12 and the telescoping leg portion 14 as the radial-inwardly-urging surface 56' extends from, for example, the distal end $56_D$ to the proximal end $56_P$. In an example, the ramp angle θ may be approximately equal to 15°.

Because the rocker latch-engaging finger 50 is radially fixed within the radial passage 54*b* of the sleeve body 52 of the latch actuator pull sleeve 48 against the ramp surface/radial-inwardly-urging surface 56' and because the radial biasing member 36 imparts the radially-outwardly bias X to the rocker latch 38, when the latch actuator pull sleeve 48 is pulled downwardly Y' (see, e.g., FIGS. 15B-15C) toward the proximal end $28_P$ of the shaft body 28, the latch-engaging finger 50 remains disposed adjacent the ramp surface/radial-inwardly-urging surface 56' and urges rotation R (see, e.g., FIG. 15B) of the rocker latch 38 about the latch pin 42, thereby overcoming the radially-outward bias X imparted by the radial biasing member 36 as the rocker latch-engaging finger 50 slides along the ramp surface/radial-inwardly-urging surface 56' in the direction from the distal end $56_D$ to the proximal end $56_P$ according to the arrow Y'. Furthermore, when the latch actuator pull sleeve 48 is pulled downwardly Y' toward the proximal end $28_P$ of the shaft body 28, the axial bias Y imparted to the sleeve body 52 is overcome, thereby causing the axial biasing member 44 to be compressed between the axial biasing member engagement surface 34*c* and the axial biasing member urging surface 58*c* defining the axial biasing member cavity 60.

Figure 15A:
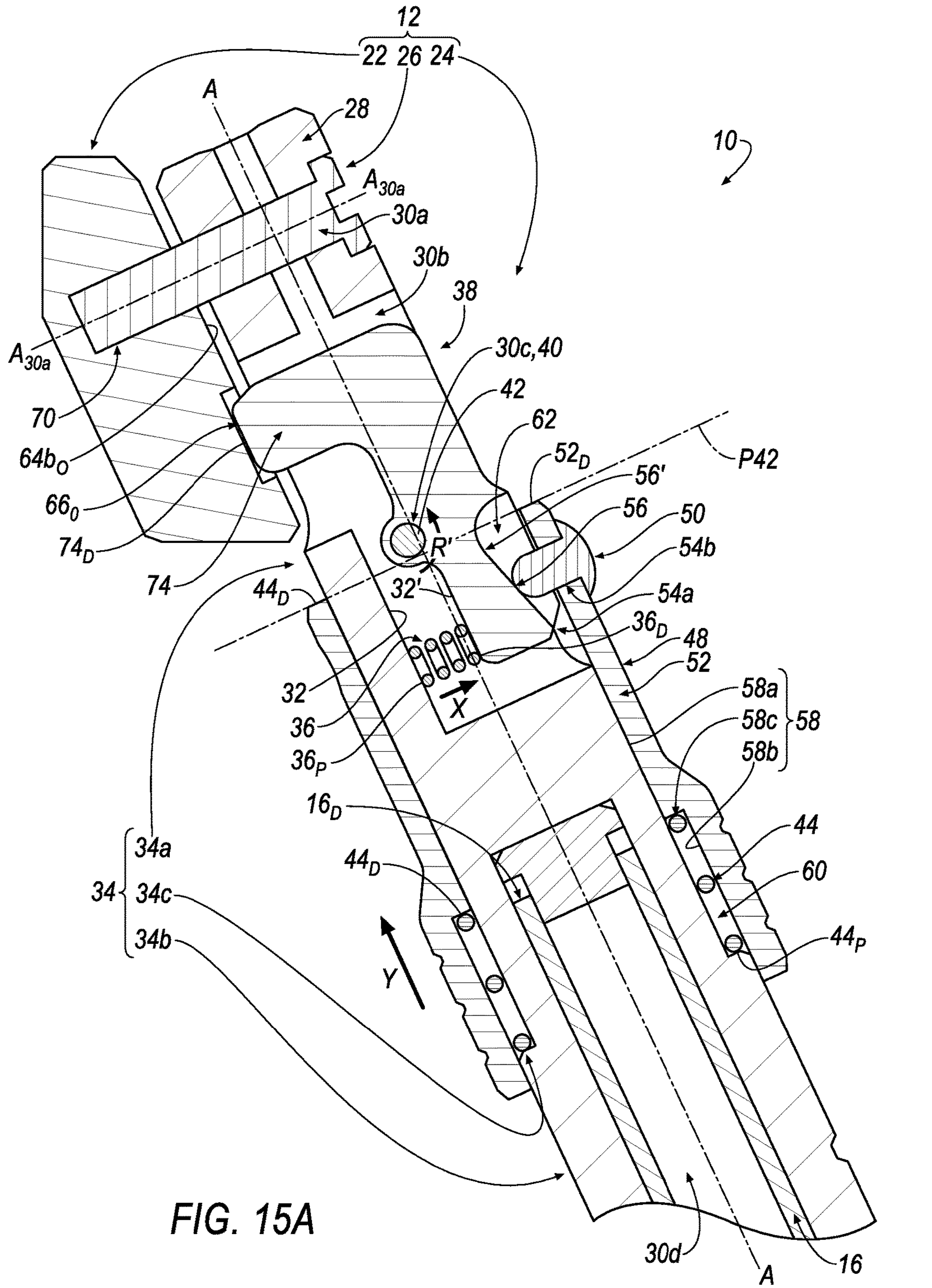
FIG. 15A is a cross-sectional view of the pod assembly according to line 15A-15A of FIG. 14.
Figure 15B:
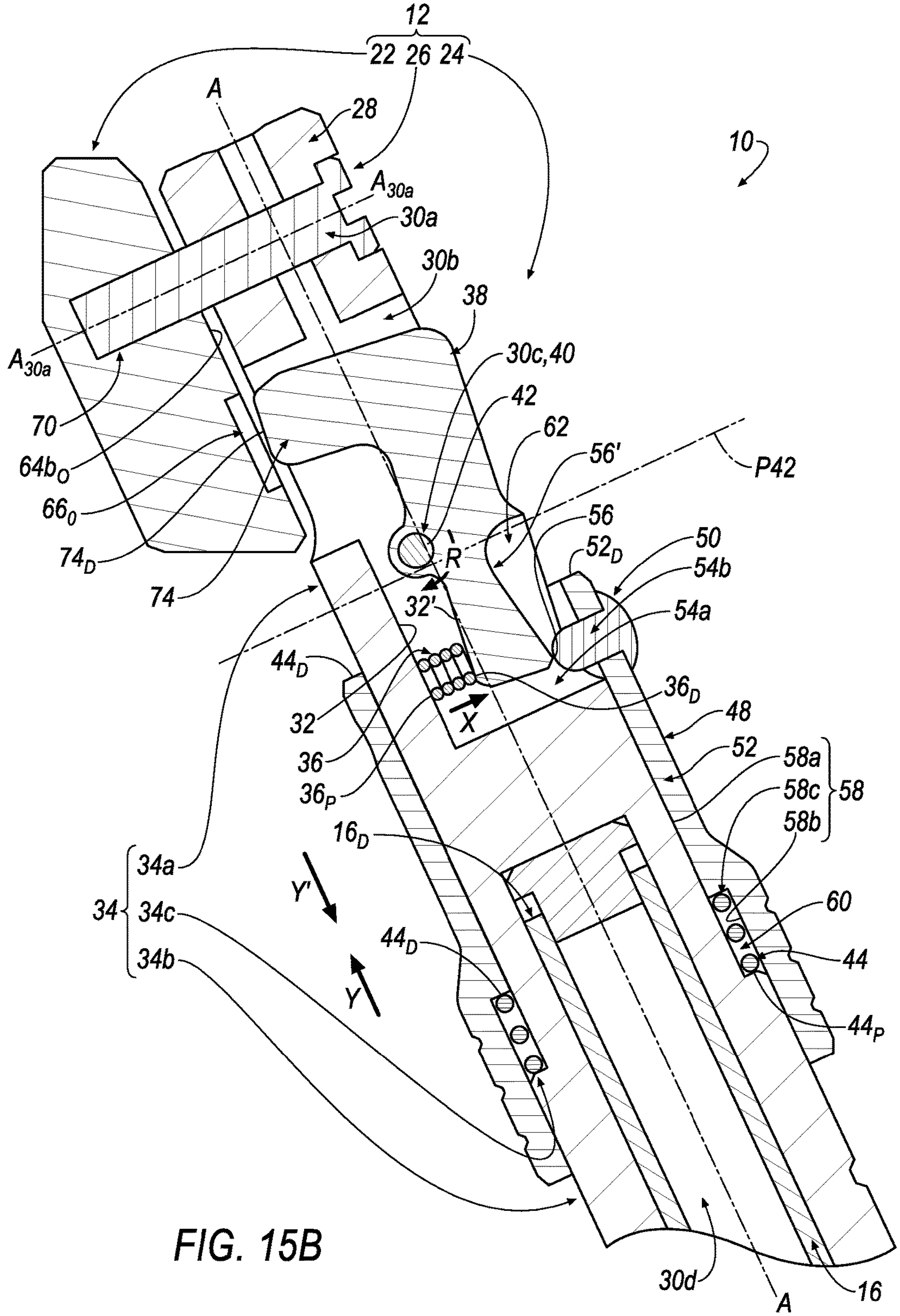
FIG. 15B is a cross-sectional view of the pod assembly according to line 15B-15B of FIG. 14.
Figure 15C:
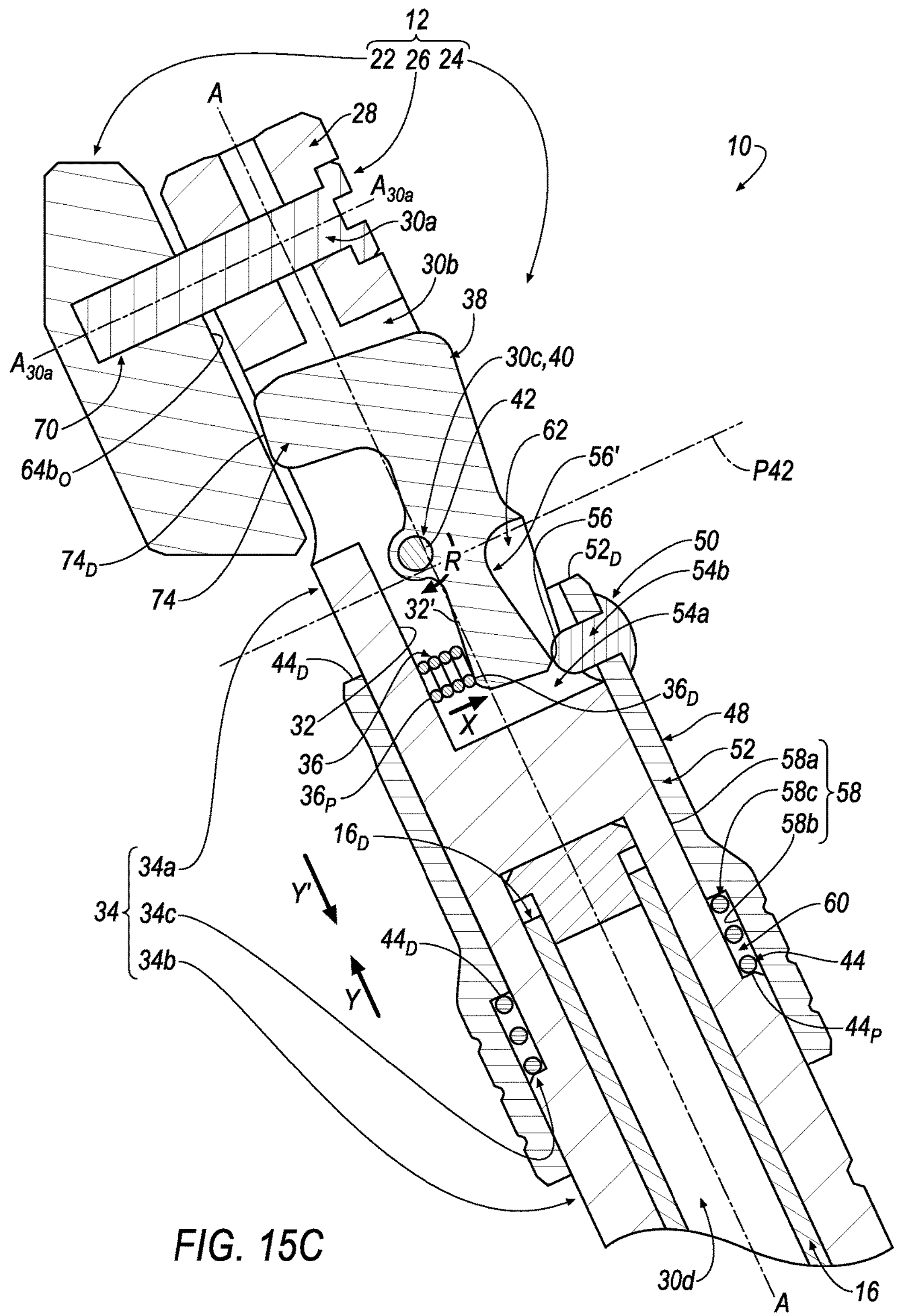
FIG. 15C is a cross-sectional view of the pod assembly according to line 15C-15C of FIG. 14.

Furthermore, as seen in FIGS. 15B-15C, when the axial biasing member 44 is compressed as described above, the axial biasing member cavity 60 is no longer defined by the second and third length portion segments $L_{58b-2}$, $L_{58b-3}$ of the length portion $L_{58b}$ of the second axial surface portion 58*b* of the inner surface 58 of the sleeve body 52 being arranged radially opposite the first and second length portion segments $L_{34a-1}$, $L_{34a-2}$ of the length portion $L_{34a}$ of the first axial surface portion 34*a* of the shaft body 28. Conversely, with reference to FIGS. 3 and 11, the modified axial orientation of the latch actuator pull sleeve 48 related to the shaft body 28 as seen in FIGS. 15B-15C results in an axial dimension component of the axial biasing member cavity 60 being reduced such that the axial dimension component of the axial biasing member cavity 60 is defined by the third length portion segment $L_{58b-3}$ of the length portion $L_{58b}$ of the second axial surface portion 58*b* of the inner surface 58 of the sleeve body 52 being arranged radially opposite the second length portion segment $L_{34a-2}$ of the length portion $L_{34a}$ of the first axial surface portion 34*a* of the shaft body 28.

Figure 15D:
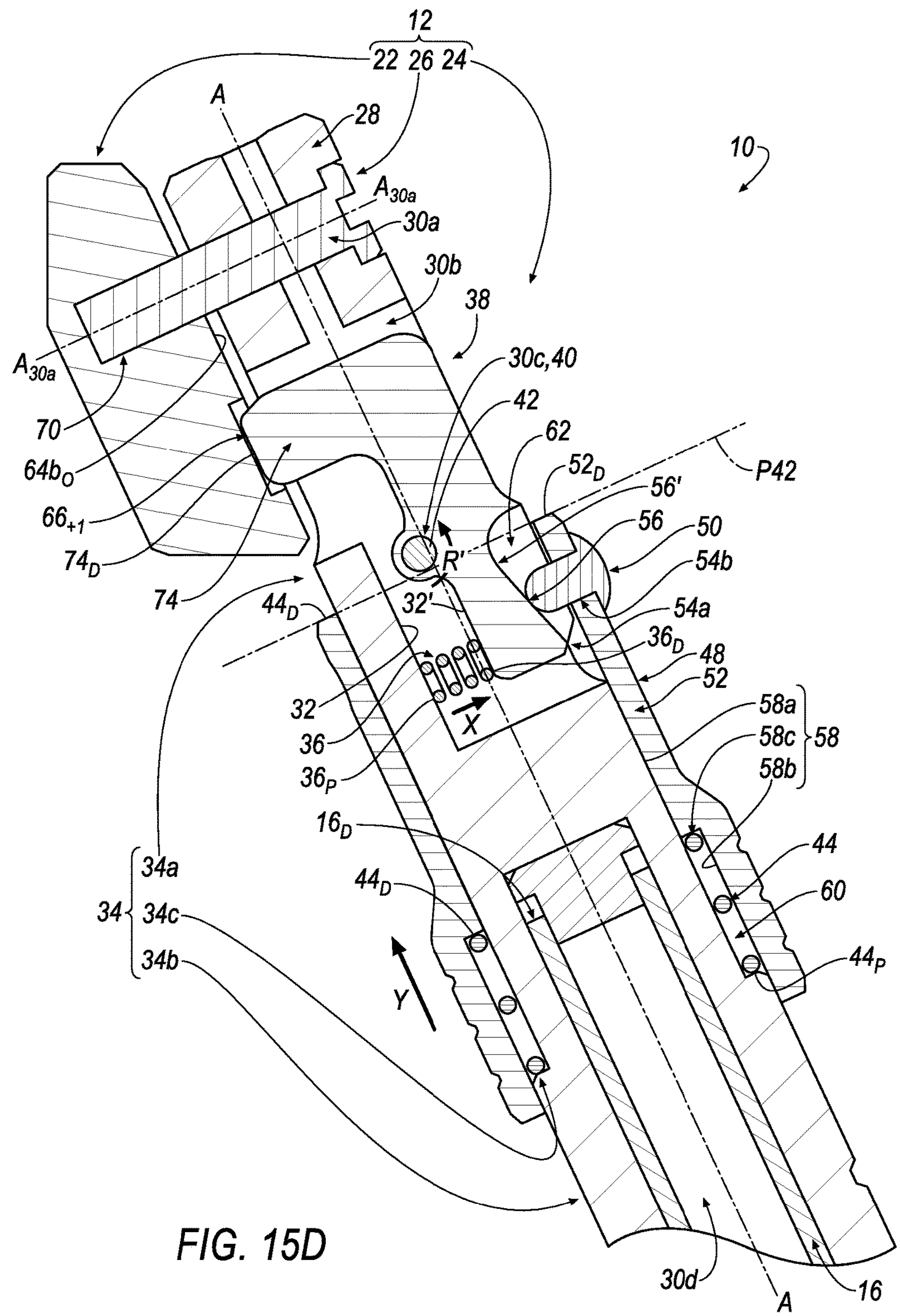
FIG. 15D is a cross-sectional view of the pod assembly according to line 15D-15D of FIG. 14.

With reference to FIGS. 15A and 15D, when the latch actuator pull sleeve 48 is not pulled downwardly Y' toward the proximal end $28_P$ of the shaft body 28, the axial bias Y of the axial biasing member 44 urges the sleeve body 52 upwardly (see direction of the axial bias arrow Y) toward the distal end $28_D$ of the shaft body 28 until the distal end $52_D$ of the sleeve body 52 is disposed adjacent the outer surface $42_O$ of the latch pin 42 (as seen in FIG. 1C) as a result of, for example, the distal end $42_D$ of the latch pin 42 extending radially beyond the outer surface portion 34 of the shaft body 28. Correspondingly, the latch-engaging finger 50 remains disposed adjacent the ramp surface 56' and slides upwardly (see direction of the axial bias arrow Y from the proximal end $56_P$ to the distal end $56_D$) with the sleeve body 52. When the axial orientation of the latch actuator pull sleeve 48 related to the shaft body 28 changes from a pulled down orientation Y' to an upwardly-urged orientation Y, the latch-engaging finger 50 slides upwardly Y with the sleeve body 52 from the proximal end $56_P$ of the ramp surface 56' to the distal end $56_D$ of the ramp surface 56', the radially-outward bias X imparted by the radial biasing member 36 causes the rocker latch 38 to rotate R' (see, e.g., FIG. 15D) in a direction opposite the rotate R about the latch pin 42.

Figure 16A:
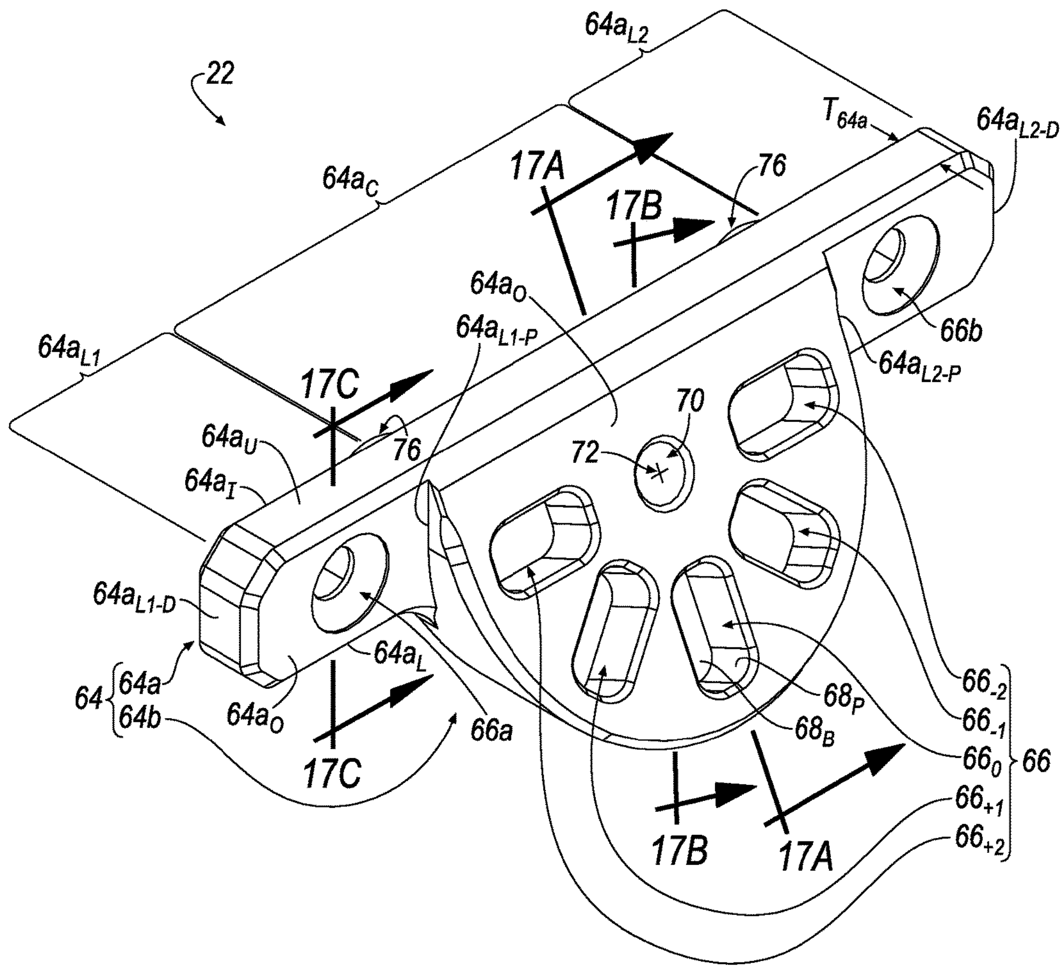
FIG. 16A is a front isometric view of an exemplary indexing plate of an exemplary leg indexing portion of an exemplary pod assembly.
Figure 16B:
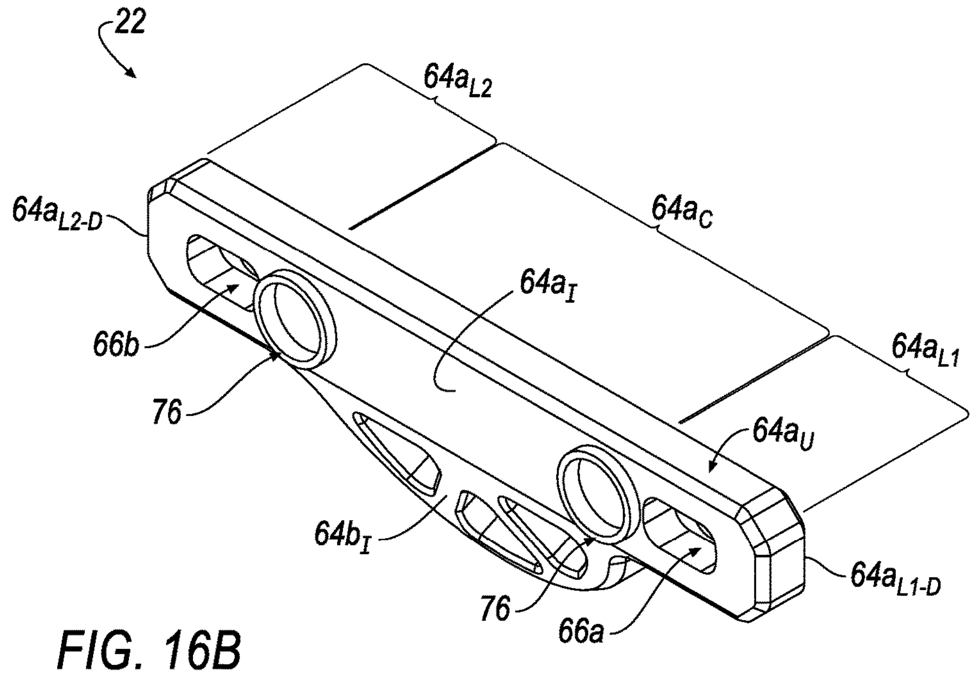
FIG. 16B is a rear isometric view of the indexing plate of FIG. 16A.
Figure 16C:
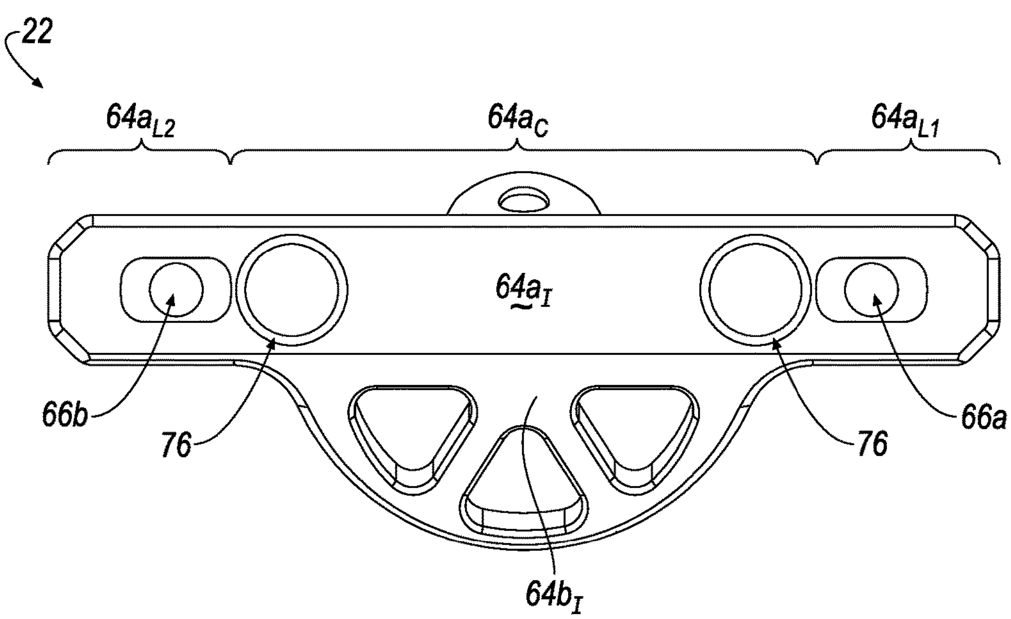
FIG. 16C is a rear view of the indexing plate of FIG. 16A.

Referring to FIGS. 1A, 16A-16C, 17A-17C, the indexing plate 22 may include a plate body 64. As seen in FIG. 16A, the plate body 64 may generally define a firearm-engaging body portion 64*a* and a biased latch subassembly-engaging body portion 64*b*.

The firearm-engaging body portion 64*a* includes an inner surface $64a_I$, an outer surface $64a_O$, an upper surface $64a_U$ and a lower surface $64a_L$. The firearm-engaging body portion 64*a* may be further defined by a thickness $T_{64a}$ extending between the inner surface $64a_I$ and the outer surface $64a_O$.

The firearm-engaging body portion 64*a* may be further defined by a central body portion $64a_C$, a first lateral body portion $64a_{L1}$ and a second lateral body portion $64a_{L2}$. The first lateral body portion $64a_{L1}$ may be defined as having a proximal end $64a_{L1-P}$ and a distal end $64a_{L1-D}$. The second lateral body portion $64a_{L2}$ may be defined as having a proximal end $64a_{L2-P}$ and a distal end $64a_{L2-D}$. The central body portion $64a_C$ extends between the proximal end $64a_{L1-P}$ of the first lateral body portion $64a_{L1}$ and the proximal end $64a_{L2-P}$ of the second lateral body portion $64a_{L2}$.

A first fastener passage 66*a* may be defined by the first lateral body portion $64a_{L1}$. A second fastener passage 66*b* may be defined by the second lateral body portion $64a_{L2}$. The first and second fastener passages 66*a*, 66*b* extend through the thickness $T_{64a}$ of the firearm-engaging body portion 64*a*.

Figure 17A:
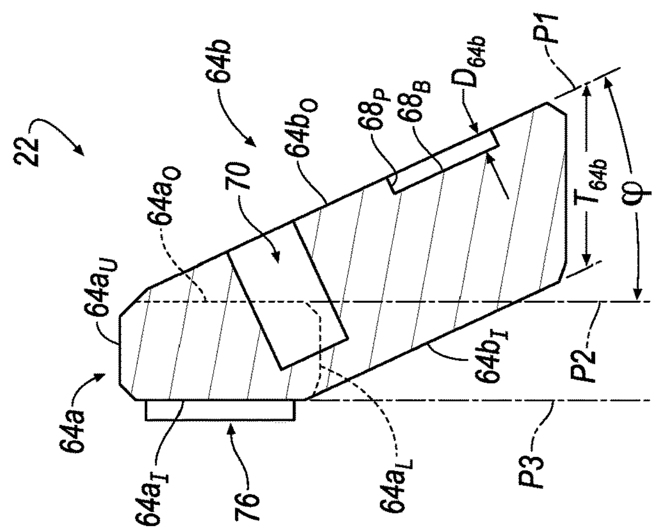
FIG. 17A is a cross-sectional view of the indexing plate according to line 17A-17A of FIG. 16A.
Figure 17B:
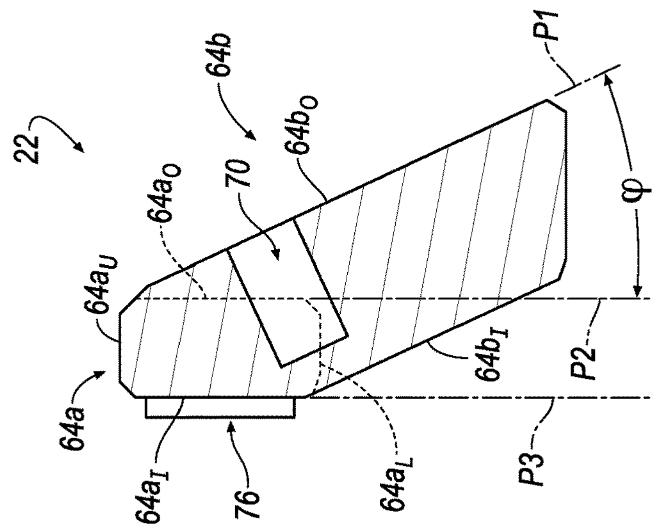
FIG. 17B is a cross-sectional view of the indexing plate according to line 17B-17B of FIG. 16B.
Figure 17C:
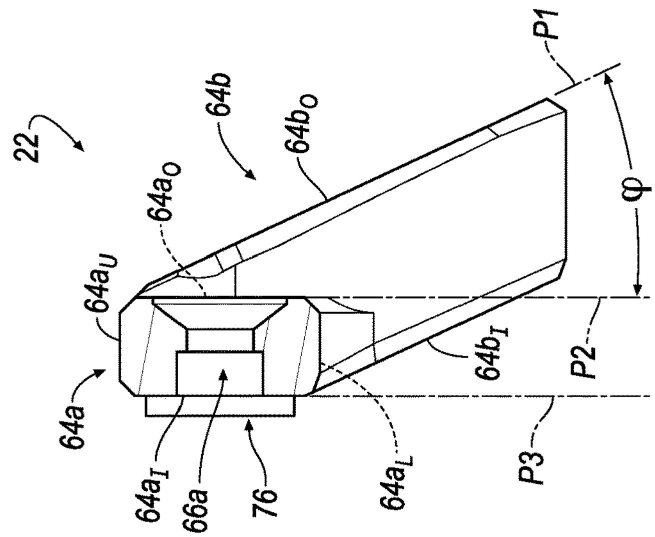
FIG. 17C is a cross-sectional view of the indexing plate according to line 17C-17CA of FIG. 16C.

With reference to FIGS. 17A-17C, the biased latch subassembly-engaging body portion 64*b* extends from one or both of the outer surface $64a_O$ and the lower surface $64a_L$ of the firearm-engaging body portion 64*a*. In an example, as seen in FIG. 16A, the biased latch subassembly-engaging body portion 64*b* extends from one or both of the outer surface $64a_O$ and the lower surface $64a_L$ of the firearm-engaging body portion 64*a* between the proximal end $64a_{L1-P}$ of the first lateral body portion $64a_{L1}$ and the proximal end $64a_{L2-P}$ of the second lateral body portion $64a_{L2}$; as a result, the biased latch subassembly-engaging body portion 64*b* may be defined as extending from the central body portion $64a_C$ of the firearm-engaging body portion 64*a*.

In an implementation, as seen in FIGS. 17A-17C the biased latch subassembly-engaging body portion 64*b* extends away from the outer surface $64a_O$ of the firearm-engaging body portion 64*a* at a biased latch subassembly-engaging body portion angle φ. The biased latch subassembly-engaging body portion angle φ may be referenced from a first reference plane P1 aligned with and extending across the outer surface $64b_O$ of the biased latch subassembly-engaging body portion 64*b* and a second reference plane P2 aligned with and extending across the outer surface $64a_O$ of the firearm-engaging body portion 64*a*. In an example, the biased latch subassembly-engaging body portion angle φ may be approximately equal to 20°. The second reference plane P2 aligned with and extending across the outer surface $64a_O$ of the firearm-engaging body portion 64*a* may be substantially parallel to a third reference plane P3 aligned with and extending across the inner surface $64a_I$ of the firearm-engaging body portion 64*a*.

Referring to FIG. 16A, the outer surface $64b_O$ of the biased latch subassembly-engaging body portion 64*b* may define a plurality of rocker latch-receiving recesses 66 that extend into a thickness $T_{64b}$ (see, e.g., FIG. 17A) of the biased latch subassembly-engaging body portion 64*b* at a depth $D_{64b}$ (see, e.g., FIG. 17A). The thickness $T_{64b}$ may be bound by the outer surface $64b_O$ of the biased latch subassembly-engaging body portion 64*b* and an inner surface $64b_I$ (see, e.g., FIGS. 17A-17C) of the biased latch subassembly-engaging body portion 64*b*. In an implementation, the depth $D_{64b}$ is not equal to the thickness $T_{64b}$ of the biased latch subassembly-engaging body portion 64*b*, and as a result, the plurality of rocker latch-receiving recesses 66 do not extend through the entire thickness $T_{64b}$ of the biased latch subassembly-engaging body portion 64*b*.

In an example, as seen in FIGS. 16A and 17A, the outer surface $64b_O$ of the biased latch subassembly-engaging body portion 64*b* that defines each rocker latch-receiving recesses $66_0$, $66_{+1}$, $66_{+2}$, $66_{-1}$, $66_{-2}$ of the plurality of rocker latch-receiving recesses 66 includes a recess surface $68_B$ and a perimeter recess surface $68_P$. The perimeter recess surface $68_P$ is connected to and may extend substantially perpendicularly from the outer surface $64b_O$ of the biased latch subassembly-engaging body portion 64*b*. The recess surface $68_B$ is connected to and may extend substantially perpendicularly from the perimeter recess surface $68_P$. As seen in FIG. 17A, the perimeter recess surface $68_P$ extends between the recess surface $68_B$ and the outer surface $64b_O$ of the biased latch subassembly-engaging body portion 64*b* at a distance approximately equal to the depth $D_{64b}$.

Referring to FIG. 16A, the plurality of rocker latch-receiving recesses 66 may include at least two (see, e.g., reference numerals $66_0$, $66_{+1}$, $66_{+2}$, $66_{-1}$, $66_{-2}$) rocker latch-receiving recesses 66. In an example, the plurality of rocker latch-receiving recesses 66 includes five rocker latch-receiving recesses $66_0$, $66_{+1}$, $66_{+2}$, $66_{-1}$, $66_{-2}$ defined by, for example: a neutral leg orientation recess $66_0$, a first positively-indexed leg orientation recess $66_{+1}$, a second positively-indexed leg orientation recess $66_{+2}$, a first negatively-indexed leg orientation recess $66_{-1}$ and a second negatively-indexed leg orientation recess $66_{-2}$.

In an example, the plurality of rocker latch-receiving recesses 66 are arranged in an arcuate orientation to permit selective pivotable adjustment (in a positive direction according to arrow P or a negative direction according to arrow P') of the biased latch subassembly 24 in one of a plurality of orientations along, for example, a 180° arc as seen in FIGS. 14A-14D. According to the illustrated example at FIGS. 14A-14D, the five rocker latch-receiving recesses $66_0$, $66_{+1}$, $66_{+2}$, $66_{-1}$, $66_{-2}$ permit the biased latch subassembly 24 to be pivotally-adjusted P/P' (see, e.g., FIGS. 14A-14D) relative the indexing plate 22 from, for example, a neutral orientation (see, e.g., FIG. 14A where the rocker latch 38 of the biased latch subassembly 24 is registered within the neutral leg orientation recess $66_0$) to any desirable orientation, such as, for example: (1) a first forward orientation pivoted +45° from the neutral for registration within the first positively-indexed leg orientation recess $66_{+1}$, (2) a second forward orientation pivoted +90° from the neutral for registration within the second positively-indexed leg orientation recess $66_{+2}$, (3) a first rearward orientation pivoted −45° from the neutral for registration within the first negatively-indexed leg orientation recess $66_{-1}$ or (4) a second rearward orientation pivoted −90° from the neutral for registration within the second negatively-indexed leg orientation recess $66_{-2}$.

Referring to FIGS. 1A, 16A and 17A-17B, the plate body 64 may further define a pivot-pin-receiving passage 70. The pivot-pin-receiving passage 70 may extend through both of the firearm-engaging body portion 64*a* and the biased latch subassembly-engaging body portion 64*b* between the inner surface $64a_I$ of the firearm-engaging body portion 64*a* and the outer surface $64b_O$ of the biased latch subassembly-engaging body portion 64*b*. As seen in FIG. 16A, the pivot-pin-receiving passage 70 may be formed in an axial center 72 of the arcuate orientation of the plurality of rocker latch-receiving recesses 66.

As seen in FIG. 1A, the pivot-pin-receiving passage 70 of the plate body 64 of the indexing plate 22 is co-axially aligned with the axis $A_{30a}$-$A_{30a}$ extending through the pivot-pin-receiving passage 30*a* of the shaft body 28 of the biased latch subassembly 24. After co-axially aligning the pivot-pin-receiving passages 30*a*, 70 of the shaft body 28 and the plate body 64, the pivot pin 26 is disposed within the pivot-pin-receiving passages 30*a*, 70 of the shaft body 28 and the plate body 64 for pivotally-connecting P the biased latch subassembly 24 to the indexing plate 22.

After the pivotally-connecting P the biased latch subassembly 24 to the indexing plate 22, the pod assembly 10 may be utilized by a user. In an example, the user may apply the pulling force (see, e.g., arrow Y') to the latch actuator pull sleeve 48 for overcoming the axial bias (see, e.g., arrow Y) and radial bias (see, e.g., arrow X) of the axial biasing member 44 and the radial biasing member 36 as described above. When the rocker latch 38 is rotated R/R' as described above in response to the pulling force Y'/the axial bias Y described above, a head portion 74 (see, e.g., FIGS. 1A, 6-7 and 15A-15D) of the rocker latch 38 may be registered within/de-registered from any rocker latch-receiving recesses $66_0$, $66_{+1}$, $66_{+2}$, $66_{-1}$, $66_{-2}$ of the plurality of rocker latch-receiving recesses 66.

In an example, as seen in FIGS. 15B and 15C, when a user pulls the latch actuator pull sleeve 48 with the pulling force Y', the rocker latch 38 is rotated R in order to cause the head portion 74 of the rocker latch 38 to be withdrawn from/de-registered from any rocker latch-receiving recesses $66_0$, $66_{+1}$, $66_{+2}$, $66_{-1}$, $66_{-2}$ of the plurality of rocker latch-receiving recesses 66. Conversely, in an example, as seen in FIGS. 15A and 15D, when a user is not applying the pulling force Y' to the latch actuator pull sleeve 48, the axial bias Y imparted by the axial biasing member 44 is translated through intervening structure (see, e.g., reference numerals 38, 48, 50) of the biased latch subassembly 24 such that the radial bias X imparted by the radial biasing member 36 rotationally urges R' the head portion 74 of the rocker latch 38 for registration within any rocker latch-receiving recesses $66_0$, $66_{+1}$, $66_{+2}$, $66_{-1}$, $66_{-2}$ of the plurality of rocker latch-receiving recesses 66 such that at least a distal surface $74_D$ (see also, e.g., FIG. 7) of the head portion 74 of the rocker latch 38 is biased into/registered within any rocker latch-receiving recesses $66_0$, $66_{+1}$, $66_{+2}$, $66_{-1}$, $66_{-2}$ of the plurality of rocker latch-receiving recesses 66.

Furthermore (with reference to FIG. 15C), in the event that the user is not applying the pulling force Y' to the latch actuator pull sleeve 48 when the head portion 74 of the rocker latch 38 is not aligned with a rocker latch-receiving recesses $66_0$, $66_{+1}$, $66_{+2}$, $66_{-1}$, $66_{-2}$ of the plurality of rocker latch-receiving recesses 66, the axial bias Y imparted by the axial biasing member 44 may be translated through intervening structure (see, e.g., reference numerals 38, 48, 50) of the biased latch subassembly 24 such that the radial bias X imparted by the radial biasing member 36 may rotationally urge (see, e.g., arrow R' in FIGS. 15A, 15D) the head portion 74 of the rocker latch 38 adjacent the outer surface $64b_O$ of the biased latch subassembly-engaging body portion 64*b* of the plate body 64 of the indexing plate 22 such that the distal surface $74_D$ of the head portion 74 of the rocker latch 38 is biased into/disposed adjacent the outer surface $64b_O$ of the biased latch subassembly-engaging body portion 64*b* and not registered within any rocker latch-receiving recesses $66_0$, $66_{+1}$, $66_{+2}$, $66_{-1}$, $66_{-2}$ of the plurality of rocker latch-receiving recesses 66. In such an intermediate orientation whereby the rocker latch 38 is arranged between neighboring rocker latch-receiving recesses $66_0$, $66_{+1}$, $66_{+2}$, $66_{-1}$, $66_{-2}$ of the plurality of rocker latch-receiving recesses 66, the user is still permitted to pivot P/P' the biased latch subassembly 24 relative the indexing plate 22 until the head portion 74 of the rocker latch 38 is aligned with a rocker latch-receiving recesses $66_0$, $66_{+1}$, $66_{+2}$, $66_{-1}$, $66_{-2}$ of the plurality of rocker latch-receiving recesses 66. Upon aligning the rocker latch 38 with a rocker latch-receiving recesses $66_0$, $66_{+1}$, $66_{+2}$, $66_{-1}$, $66_{-2}$ of the plurality of rocker latch-receiving recesses 66 in response to the pivoting movement P/P', the axial bias Y imparted by the axial biasing member 44 is translated through intervening structure (see, e.g., reference numerals 38, 48, 50) of the biased latch subassembly 24 such that the radial bias X imparted by the radial biasing member 36 rotationally urges R' the head portion 74 of the rocker latch 38 for automatic registration within any rocker latch-receiving recesses $66_0$, $66_{+1}$, $66_{+2}$, $66_{-1}$, $66_{-2}$ of the plurality of rocker latch-receiving recesses 66 such that at least the distal surface $74_D$ of the head portion 74 of the rocker latch 38 is automatically biased into/automatically registered within any rocker latch-receiving recesses $66_0$, $66_{+1}$, $66_{+2}$, $66_{-1}$, $66_{-2}$ of the plurality of rocker latch-receiving recesses 66.

Referring to FIGS. 18A-18B, an exemplary pod assembly 10*a*, which may be substantially similar to the pod assembly 10 described above, is shown attached to a device, such as, for example, a firearm F for forming a firearm implement system 100. In an example, the pod assembly 10*a* is shown attached to a mounting rail $R_{S1}$ of the firearm F.

In an example, the mounting rail $R_{S1}$ may be one mounting rail of a plurality of mounting rails of the firearm F. In an example, as seen in FIGS. 18A-18B, the firearm F may include seven mounting rails including, for example, a first lateral side mounting rail $R_{S1}$, a second lateral side mounting rail $R_{S2}$ (see, e.g., FIG. 18B), an upper mounting rail $R_U$, a first upper-intermediate side mounting rail $R_{S1\text{-}UI}$, a first lower-intermediate side mounting rail $R_{S1\text{-}LI}$, a second upper-intermediate side mounting rail $R_{S2\text{-}UI}$ (see, e.g., FIG. 18B) and a second lower-intermediate side mounting rail $R_{S2\text{-}LI}$ (see, e.g., FIG. 18B). The first lateral side mounting rail $R_{S1}$ is arranged opposite the second lateral side mounting rail $R_{S2}$, and the upper mounting rail $R_U$ is arranged between the first lateral side mounting rail $R_{S1}$ and the second lateral side mounting rail $R_{S2}$ and an upper mounting rail $R_U$. In an implementation, each of the mounting rails $R_{S1}$, $R_{S1\text{-}UI}$, $R_{S1\text{-}LI}$, $R_{S2}$, $R_{S2\text{-}UI}$, $R_{S2\text{-}LI}$, $R_U$ described above is not a lower mounting rail (that would be located directly opposite the upper mounting rail $R_U$), and, as seen in FIGS. 18A-18B, the firearm F does not include a lower mounting rail.

In conjunction with the exemplary configuration of the mounting rails $R_{S1}$, $R_{S1\text{-}UI}$, $R_{S1\text{-}LI}$, $R_{S2}$, $R_{S2\text{-}UI}$, $R_{S2\text{-}LI}$, $R_U$ described above, the pod assembly 10*a* is shown attached to the first lateral side mounting rail $R_{S1}$. In such an exemplary implementation, when the pod assembly 10*a* is attached to the first lateral side mounting rail $R_{S1}$, the indexing plate 22 of the leg indexing portion 12 is only attached to the first lateral side mounting rail $R_{S1}$ and not to any other mounting rail (e.g., the second lateral side mounting rail $R_{S2}$ and the upper mounting rail $R_U$) of the plurality of mounting rails.

As seen in FIG. 18A, in an implementation, the indexing plate 22 of the leg indexing portion 12 of the pod assembly 10*a* is attached to the first lateral side mounting rail $R_{S1}$ by firstly inserting: (1) a fastener 102*a* through the first fastener passage 66*a* defined by the first lateral body portion 64*a*$_{L1}$ of the firearm-engaging body portion 64*a* of the plate body 64 of the indexing plate 22 and (2) a fastener 102*b* through the second fastener passage 66*b* defined by the second lateral body portion 64*a*$_{L2}$ of the firearm-engaging body portion 64*a* of the plate body 64 of the indexing plate 22. After the fasteners 102*a*, 102*b* are interested into the first and second fastener passages 66*a*, 66*b* of the indexing plate 22 as described above, the fasteners 102*a*, 102*b* are further extended into corresponding fastener passages (not shown) formed by the first lateral side mounting rail $R_{S1}$ of the firearm F.

In an example, the fastener passages formed by the first lateral side mounting rail $R_{S1}$ of the firearm F may include any desirable geometry such as, for example, a 'keymod' geometry. Although fasteners 102*a*, 102*b* and fastener passages are described above utilizing a 'keymod' geometry, the indexing plate 22 may be designed to include an alternative attachment geometry for attaching the indexing plate 22 to the first lateral side mounting rail $R_{S1}$ of the firearm F in another manner; for example, the inner surface 64*a*$_I$ of the firearm-engaging body portion 64*a* of the plate body 64 of the indexing plate 22 may be formed to include a 'Weaver-style' or 'Picatinny-style' geometry that interfaces with a corresponding 'Weaver-style' or 'Picatinny-style' geometry of the first lateral side mounting rail $R_{S1}$ of the firearm F.

Furthermore, as seen in FIGS. 16B-16C and 17A-17C, the inner surface 64*a*$_I$ of the firearm-engaging body portion 64*a* of the plate body 64 of each indexing plate 22 may include one or more (e.g., two) rail registration projections 76. The rail registration projections 76 may be inserted into passages (not shown) formed by the first lateral side mounting rail $R_{S1}$ of the firearm F prior to the fasteners 102*a*, 102*b* being extended into corresponding fastener passages (not shown) formed by the first lateral side mounting rail $R_{S1}$ of the firearm F. In an example, by firstly registering the rail registration projections 76 within the passages formed by the first lateral side mounting rail $R_{S1}$ of the firearm F, the first fastener passage 66*a* defined by the first lateral body portion 64*a*$_{L1}$ of the firearm-engaging body portion 64*a* of the plate body 64 of the indexing plate 22 and the second fastener passage 66*b* defined by the second lateral body portion 64*a*$_{L2}$ of the firearm-engaging body portion 64*a* of the plate body 64 of the indexing plate 22 may be automatically-aligned with corresponding passages formed by the first lateral side mounting rail $R_{S1}$ of the firearm F for receiving the fasteners 102*a*, 102*b*.

Referring to FIG. 18B, when the pod assembly 10*a* is attached to the first lateral side mounting rail $R_{S1}$ of the firearm F, the pod assembly 10*a* may function as a mono-pod. In some implementations, a user may desire the pod assembly 10*a* to act as a mono-pod extending from a side portion (i.e., the region of the firearm F generally defined by the first lateral side mounting rail $R_{S1}$ of the firearm F) and not the bottom portion (i.e., the region of the firearm F generally defined by the bottom side of the firearm F where a lower mounting rail is not provided) of the firearm F whereby the user desires to utilize a portion of the ambient environment (see, e.g., a rock or boulder B in FIGS. 18A-18B) as a support surface that is disposed adjacent one or more of an opposite side portion (i.e., the region of the firearm F generally defined by the second lateral side mounting rail $R_{S2}$ of the firearm F) and the bottom portion (i.e., the region of the firearm F generally defined by the bottom side of the firearm F where a lower mounting rail is not provided) of the firearm F.

With continued reference to FIG. 18B, the pod assembly 10*a* may also (or alternatively) function as a hand grip extending from, for example, a side portion (i.e., the region of the firearm F generally defined by the first lateral side mounting rail $R_{S1}$ of the firearm F) and not the bottom portion (e.g., the region of the firearm F generally defined by the bottom side of the firearm F where a lower mounting rail is not provided) of the firearm F. In such a configuration, one or both of the first outer diameter $D_{28\text{-}1}$ and the second outer diameter $D_{28\text{-}2}$ of the shaft body 28 of the leg indexing portion 12 may be sized for receiving a user's hand, palm or fingers arranged there-about.

With continued reference to FIG. 18B, a firearm axis F-F (see also FIG. 18A) is co-axial with a central axis extending along the entire length of the firearm F. A firearm plane F1 that is substantially orthogonal to an underlying ground surface G intersects with the firearm axis F-F and the axis A-A extending through the pod assembly 10*a*. Furthermore, as seen in FIG. 18B, when the pod assembly 10*a* is attached to the first lateral side mounting rail $R_{S1}$ of the firearm F, the first reference plane P1 is substantially parallel to the axis A-A extending through the pod assembly 10*a*. Even further, each of the second reference plane P2 and the third reference plane P3 is substantially parallel to the firearm plane F1. Yet even further, the third reference plane P3 is aligned with a lateral side rail plane (not shown); the lateral side rail plane is aligned with and extends across an outer surface (not shown) of the first lateral side mounting rail $R_{S1}$ of the firearm F. Therefore, for illustrative purposes, the third reference plane P3 may also be the lateral side rail plane of the first lateral side mounting rail $R_{S1}$ when the pod assembly 10*a* is attached to the firearm F.

As a result of the relationship between the axes A-A, F-F and planes P1, P2, P3, F1 described above, the biased latch subassembly-engaging body portion angle $\varphi$ also defines a firearm support angle $\varphi'$. As seen in FIG. 18B, the firearm support angle $\varphi'$ is bound by the axis A-A and the firearm plane F1. Therefore, in an example, if the biased latch subassembly-engaging body portion angle $\varphi$ is approximately equal to 20°, then the firearm support angle $\varphi'$ is also approximately equal to 20°.

Furthermore, because the biased latch subassembly 24 of the pod assembly 10*a* is pivotably connected P/P' to the indexing plate 22 of the pod assembly 10*a*, any pivoting movement P/P' of the leg indexing portion 12 of the first pod assembly 10*a* relative the firearm F is limited according to the arrows P/P' (see, e.g., FIGS. 14A-14D). In other words, the pod assembly 10*a* is not pivotably-configured in a manner to 'collapse' the leg indexing portion 12 relative the firearm F by, for example, reducing the firearm support angle φ' (in order to, for example, pivotably-adjust the leg indexing portion 12 in a manner for locating, as an example, the optional foot portion 18 of the optional telescoping leg portion 14 substantially below or under either of the first lower-intermediate side mounting rail $R_{S1-LI}$ or the second lower-intermediate side mounting rail $R_{S2-LI}$. In an example, however, the pod assembly 10*a* is pivotably-configured in a manner to 'collapse' the leg indexing portion 12 relative the firearm F by, for example, pivoting P' the biased latch subassembly 24 relative the indexing plate 22 such that the head portion 74 of the rocker latch 38 is registered within the second negatively-indexed leg orientation recess $66_{-2}$ such that the biased latch subassembly 24 is pivoted P' relative the indexing plate 22 to the second rearward orientation −90° in order to arrange the biased latch subassembly 24 along the barrel of the firearm F.

Referring to FIGS. 19A-19B, a first exemplary pod assembly 10*a* and a second exemplary pod assembly 10*b*, which may both be substantially similar to the pod assembly 10 described above, are shown attached to a firearm F for forming a firearm implement system 200. In an example, the pod assembly 10*a* is shown attached to a first mounting rail $R_{S1}$ of the firearm F and the pod assembly 10*b* is shown attached to a second mounting rail $R_{S2}$ of the firearm F that is opposite the first mounting rail $R_{S1}$ of the firearm F.

In an example, the first mounting rail $R_{S1}$ may be one mounting rail of a plurality of mounting rails of the firearm F; furthermore, in an example, the second mounting rail $R_{S2}$ may be another mounting rail of a plurality of mounting rails of the firearm F. In an example, as seen in FIGS. 19A-19B, the firearm F may include seven mounting rails including, for example, a first lateral side mounting rail $R_{S1}$, a second lateral side mounting rail $R_{S2}$ and an upper mounting rail $R_U$, a first upper-intermediate side mounting rail $R_{S1-UI}$, a first lower-intermediate side mounting rail $R_{S1-LI}$, a second upper-intermediate side mounting rail $R_{S2-UI}$ (see, e.g., FIG. 19B) and a second lower-intermediate side mounting rail $R_{S2-LI}$ (see, e.g., FIG. 19B). The first lateral side mounting rail $R_{S1}$ is arranged opposite the second lateral side mounting rail $R_{S2}$, and the upper mounting rail $R_U$ is arranged between the first lateral side mounting rail $R_{S1}$ and the second lateral side mounting rail $R_{S2}$ and an upper mounting rail $R_U$. In an implementation, each of the mounting rails $R_{S1}$, $R_{S1-UI}$, $R_{S1-LI}$, $R_{S2}$, $R_{S2-UI}$, $R_{S2-LI}$, $R_U$ described above is not a lower mounting rail (that would be located directly opposite the upper mounting rail $R_U$), and, as seen in FIGS. 19A-19B, the firearm F does not include a lower mounting rail.

In conjunction with the exemplary configuration of the mounting rails $R_{S1}$, $R_{S1-UI}$, $R_{S1-LI}$, $R_{S2}$, $R_{S2-UI}$, $R_{S2-LI}$, $R_U$ described above, the first pod assembly 10*a* is shown attached to the first lateral side mounting rail $R_{S1}$ and the second pod assembly 10*b* is shown attached to the second lateral side mounting rail $R_{S2}$. In such an exemplary implementation, when the first pod assembly 10*a* is attached to the first lateral side mounting rail $R_{S1}$, the indexing plate 22 of the leg indexing portion 12 of the first pod assembly 10*a* is only attached to the first lateral side mounting rail $R_{S1}$ and not to any other mounting rail (e.g., the second lateral side mounting rail $R_{S2}$ and the upper mounting rail $R_U$) of the plurality of mounting rails; furthermore, in such an exemplary implementation, when the second pod assembly 10*b* is attached to the second lateral side mounting rail $R_{S2}$, the indexing plate 22 of the leg indexing portion 12 of the second pod assembly 10*b* is only attached to the second lateral side mounting rail $R_{S2}$ and not to any other mounting rail (e.g., the first lateral side mounting rail $R_{S1}$ and the upper mounting rail $R_U$) of the plurality of mounting rails.

In an implementation, the indexing plate 22 of the leg indexing portion 12 of each of the first pod assembly 10*a* and the second pod assembly 10*b* is attached, respectively, to the first lateral side mounting rail $R_{S1}$ and the second lateral side mounting rail $R_{S2}$ by firstly inserting: (1) a fastener 102*a* through the first fastener passage 66*a* defined by the first lateral body portion $\mathbf{64}a_{L1}$ of the firearm-engaging body portion 64*a* of the plate body 64 of the indexing plate 22 and (2) a fastener 102*b* through the second fastener passage 66*b* defined by the second lateral body portion $\mathbf{64}a_{L2}$ of the firearm-engaging body portion 64*a* of the plate body 64 of the indexing plate 22. After the fasteners 102*a*, 102*b* are interested into the first and second fastener passages 66*a*, 66*b* of the indexing plate 22 as described above, the fasteners 102*a*, 102*b* are further extended into corresponding fastener passages (not shown) formed respectively by the first lateral side mounting rail $R_{S1}$ and the second lateral side mounting rail $R_{S2}$ of the firearm F. Referring to FIG. 19B, when the first pod assembly 10*a* and the second pod assembly 10*b* are respectively attached to the first lateral side mounting rail $R_{S1}$ and the second lateral side mounting rail $R_{S2}$ of the firearm F, the first pod assembly 10*a* and the second pod assembly 10*b* may cooperate with the firearm F to function as a bi-pod.

With reference to FIG. 19B, either of the first pod assembly 10*a* or the second pod assembly 10*b* may also (or alternatively) function as a hand grip extending from, for example, a side portion (e.g., the region of the firearm F generally defined by the first lateral side mounting rail $R_{S1}$ or the second lateral side mounting rail $R_{S2}$ of the firearm F) and not the bottom portion (i.e., the region of the firearm F generally defined by the bottom side of the firearm F where a lower mounting rail is not provided) of the firearm F. In such a configuration, one or both of the first outer diameter $D_{28-1}$ and the second outer diameter $D_{28-2}$ of the shaft body 28 of the leg indexing portion 12 may be sized for receiving a user's hand, palm or fingers arranged there-about.

In an example, the fastener passages formed respectively by the first lateral side mounting rail $R_{S1}$ and the second lateral side mounting rail $R_{S2}$ of the firearm F may include any desirable geometry such as, for example, a 'keymod' geometry. Although fasteners 102*a*, 102*b* and fastener passages are described above utilizing a 'keymod' geometry, the indexing plate 22 may be designed to include an alternative attachment geometry for attaching the respective indexing plates 22 to the first lateral side mounting rail $R_{S1}$ and the second lateral side mounting rail $R_{S2}$ of the firearm F in another manner; for example, the inner surface $\mathbf{64}a_I$ of the firearm-engaging body portion 64*a* of the plate body 64 of each indexing plate 22 may be formed to include a 'Weaver-style' or 'Picatinny-style' geometry that interfaces with a corresponding 'Weaver-style' or 'Picatinny-style' geometry of, respectively, the first lateral side mounting rail $R_{S1}$ and the second lateral side mounting rail $R_{S2}$ of the firearm F.

Furthermore, as described above at FIGS. 16B-16C and 17A-17C, the inner surface $\mathbf{64}a_I$ of the firearm-engaging body portion 64*a* of the plate body 64 of each indexing plate 22 may include one or more (e.g., two) rail registration projections 76. The rail registration projections 76 may be inserted into passages (not shown) formed by the first lateral side mounting rail $R_{S1}$ of the firearm F prior to the fasteners 102*a*, 102*b* being extended into corresponding fastener passages (not shown) formed by the first lateral side mounting rail $R_{S1}$ of the firearm F. In an example, by firstly registering the rail registration projections 76 within the passages formed by the first lateral side mounting rail $R_{S1}$ of the firearm F, the first fastener passage 66*a* defined by the first lateral body portion $64a_{L1}$ of the firearm-engaging body portion 64*a* of the plate body 64 of the indexing plate 22 and the second fastener passage 66*b* defined by the second lateral body portion $64a_{L2}$ of the firearm-engaging body portion 64*a* of the plate body 64 of the indexing plate 22 may be automatically-aligned with corresponding passages formed by the first lateral side mounting rail $R_{S1}$ of the firearm F for receiving the fasteners 102*a*, 102*b*.

With continued reference to FIG. 19B, a firearm axis F-F (see also FIG. 19A) is co-axial with a central axis extending along the entire length of the firearm F. A firearm plane F1 that is substantially orthogonal to an underlying ground surface G intersects with the firearm axis F-F and the axis A-A extending through the pod assembly 10*a*. Furthermore, as seen in FIG. 19B, when the first pod assembly 10*a* is attached to the first lateral side mounting rail $R_{S1}$ of the firearm F and when the second pod assembly 10*b* is attached to the second lateral side mounting rail $R_{S2}$ of the firearm F, the first reference plane P1 of each of the first pod assembly 10*a* and the second pod assembly 10*b* is substantially parallel to the axis A-A extending through each pod assembly 10*a*, 10*b*. Even further, each of the second reference plane P2 and the third reference plane P3 of each of the first pod assembly 10*a* and the second pod assembly 10*b* is substantially parallel to the firearm plane F1. Yet even further, the third reference plane P3 of each of the first pod assembly 10*a* and the second pod assembly 10*b* is aligned with a lateral side rail plane (not shown); with respect to the first pod assembly 10*a*, the lateral side rail plane is aligned with and extending across an outer surface (not shown) first lateral side mounting rail $R_{S1}$ of the firearm F, and, with respect to the second pod assembly 10*b*, the lateral side rail plane is aligned with and extending across an outer surface (not shown) second lateral side mounting rail $R_{S2}$ of the firearm F. Therefore, for illustrative purposes, the third reference plane P3 may also be the lateral side rail plane of: the first lateral side mounting rail $R_{S1}$ (with respect to the first pod assembly 10*a*), and, respectively, the second lateral side mounting rail $R_{S2}$ (with respect to the second pod assembly 10*b*) when the first pod assembly 10*a* and the second pod assembly 10*b* are attached to the firearm F.

As a result of the relationship between the axes A-A, F-F and planes P1, P2, P3, F1 described above, the biased latch subassembly-engaging body portion angle φ also defines a firearm support angle φ' of each of the first pod assembly 10*a* and the second pod assembly 10*b*. As seen in FIG. 19B, the firearm support angle φ' of each of the first pod assembly 10*a* and the second pod assembly 10*b* is bound by firearm plane F1 and the respective axis A-A extending through each of the first pod assembly 10*a* and the second pod assembly 10*b*. Therefore, in an example, if the biased latch subassembly-engaging body portion angle φ is approximately equal to 20°, then the firearm support angle φ' of each of the first pod assembly 10*a* and the second pod assembly 10*b* is also approximately equal to 20°. Because the first pod assembly 10*a* and the second pod assembly 10*b* cooperate with the firearm F to function as a bi-pod as described above, in an example, if the firearm support angle φ' of the first pod assembly 10*a* is approximately equal to 20° and, in an example, if the firearm support angle φ' of the second pod assembly 10*b* is approximately equal to 20°, then the firearm support angle φ' of each of the first pod assembly 10*a* and the second pod assembly 10*b* may cooperate to form a bi-pod firearm support angle that is approximately equal to 40°.

Furthermore, because the biased latch subassembly 24 of each of the first pod assembly 10*a* and the second pod assembly 10*b* is pivotably connected P/P' to the indexing plate 22 of the pod assembly 10*a*, any pivoting movement P/P' of the leg indexing portion 12 of each of the first pod assembly 10*a* and the second pod assembly 10*b* relative the firearm F is limited according to the arrows P/P' (see, e.g., FIGS. 14A-14D). In other words, each of the first pod assembly 10*a* and the second pod assembly 10*b* is not pivotably-configured in a manner to 'collapse' the leg indexing portion 12 of each of the first pod assembly 10*a* and the second pod assembly 10*b* relative the firearm F by, for example, reducing the firearm support angle φ' of each of the first pod assembly 10*a* and the second pod assembly 10*b* (in order to, for example, pivotably-adjust the leg indexing portion 12 of each of the first pod assembly 10*a* and the second pod assembly 10*b* in a manner for locating, as an example, the optional foot portion 18 of the optional telescoping leg portion 14 of each of the first pod assembly 10*a* and the second pod assembly 10*b* substantially below or under either of the first lower-intermediate side mounting rail $R_{S1\text{-}LI}$ (with respect to, for example, the first pod assembly 10*a*) or the second lower-intermediate side mounting rail $R_{S2\text{-}LI}$ (with respect to, for example, the second pod assembly 10*b*). In an example, however, one or more of the first pod assembly 10*a* and the second pod assembly 10*b* is/are pivotably-configured in a manner to 'collapse' the leg indexing portion 12 of one or both of the first pod assembly 10*a* and the second pod assembly 10*b* relative the firearm F by, for example, pivoting P/P' the biased latch subassembly 24 relative the indexing plate 22. In an example, the biased latch subassembly 24 of the first pod assembly 10*a* may be pivoted P' relative the indexing plate 22 of the first pod assembly 10*a* such that the head portion 74 of the rocker latch 38 is registered within the second negatively-indexed leg orientation recess $66_{-2}$ such that the biased latch subassembly 24 of the first pod assembly is pivoted P' approximately −90° relative the indexing plate 22 in order to arrange the biased latch subassembly 24 of the first pod assembly 10*a* along the barrel of the firearm F.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A biased latch subassembly, comprising:

a shaft body;

a rocker latch including a first surface and a second surface opposite the first surface;

a latch pin that rotatably-connects the rocker latch to the shaft body;

a radial biasing member disposed against the first surface of the rocker latch and the shaft body;

a rocker latch-engaging finger arranged opposite the radial biasing member and disposed slidably upon the second surface of the rocker latch in an axial direction; and a latch actuator engaging a portion of the shaft body, wherein the rocker latch-engaging finger is secured to the latch actuator, wherein the latch actuator is manipulatable between at least:

a first position relative to the shaft body, and a second position relative to the shaft body, wherein when the latch actuator is arranged in the first position, the latch actuator urges the rocker latch into an un-latched position relative to the shaft body, wherein when the latch actuator is arranged in the second position, the latch actuator permits the rocker latch to assume a latched position relative to the shaft body.

2. The biased latch subassembly of claim 1, wherein the shaft body defines a plurality of passages including at least a first passage and a second passage, wherein the rocker latch is disposed within the first passage, wherein the latch pin extends through the second passage and a co-axially-aligned latch pin-receiving passage of the rocker latch for rotatably-connecting the rocker latch to the shaft body.

3. The biased latch subassembly of claim 2, wherein the radial biasing member is disposed within the first passage between a radial biasing member engagement surface of the first passage and the first surface of the rocker latch.

4. The biased latch subassembly of claim 3, wherein the latch actuator is a latch actuator pull sleeve having an axial passage sized for receiving a portion of a length of the shaft body, wherein the latch actuator pull sleeve is slidably-disposed about an outer surface portion of the shaft body and at least a portion of a length of the second surface of the rocker latch exposed by the first passage.

5. The biased latch subassembly of claim 4, wherein the rocker latch-engaging finger is secured within a radial passage of the latch actuator pull sleeve, wherein the radial passage is in fluid communication with the axial passage of the latch actuator pull sleeve and the first passage of the shaft body, wherein a rocker-latch-engaging surface of the rocker latch-engaging finger is disposed adjacent the second surface of the rocker latch.

6. The biased latch subassembly of claim 5, further comprising:

an axial biasing member including an inner surface defining an axial passage extending between a proximal surface of the axial biasing member and a distal surface of the axial biasing member, wherein the axial passage of the axial biasing member is sized for receiving some of the portion of the length of the shaft body, wherein a first portion and a second portion of an inner surface of the latch actuator pull sleeve in combination with some of a first portion and a second portion of the outer surface portion of the shaft body forms a cavity that is sized for receiving the axial biasing member.

7. The biased latch subassembly of claim 6, wherein the axial biasing member imparts an axial bias to the latch actuator pull sleeve relative to the shaft body as a result of:

the proximal surface of the axial biasing member being disposed adjacent the second portion of the outer surface portion of the shaft body, and the distal surface of the axial biasing member being disposed adjacent the second portion of the inner surface of the latch actuator pull sleeve.

8. The biased latch subassembly of claim 7, wherein the axial bias imparted by the axial biasing member to the latch actuator pull sleeve relative to the shaft body urges slidable adjustment of the rocker-latch-engaging surface of the rocker latch-engaging finger from a proximal end of the second surface of the rocker latch toward a distal end of the second surface of the rocker latch for inducing first direction rotation of the rocker latch about the latch pin.

9. The biased latch subassembly of claim 8, wherein an axial pull force imparted to the latch actuator pull sleeve that is opposite the axial bias imparted by the axial biasing member to the latch actuator pull sleeve urges slidable movement of latch actuator pull sleeve relative to the shaft body such that the rocker latch-engaging finger is slidably-adjusted from the distal end of the second surface of the rocker latch toward the proximal end of the second surface of the rocker latch for inducing second direction rotation of the rocker latch about the latch pin that is opposite to the first direction rotation.

10. The biased latch subassembly of claim 9, wherein the axial pull force imparted to the latch actuator pull sleeve also results in a reduced axial spacing between the outer surface portion of the shaft body and the second portion of the inner surface of the latch actuator pull sleeve for axially collapsing the cavity for compressing the axial biasing member between the second portion of the outer surface portion of the shaft body and the second portion of the inner surface of the latch actuator pull sleeve.

11. The biased latch subassembly of claim 6, wherein the second passage radially traverses and is in fluid communication with the first passage.

12. The biased latch subassembly of claim 11, wherein the second passage is radially offset from the first passage by approximately 90°.

13. The biased latch subassembly of claim 6, wherein the first portion of the outer surface portion of the shaft body is defined by a first diameter of the shaft body, wherein the second portion of the outer surface portion of the shaft body projects radially away from the first portion of the outer surface portion of the shaft body for defining a second diameter of the shaft body.

14. The biased latch subassembly of claim 13, wherein the first diameter of the shaft body is less than the second diameter of the shaft body.

15. The biased latch subassembly of claim 13, wherein the first portion of the inner surface of the latch actuator pull sleeve defines a first passage diameter of the axial passage of the latch actuator pull sleeve, wherein the second portion of the inner surface of the latch actuator pull sleeve projects radially inwardly from the first portion of the inner surface of the latch actuator pull sleeve for defining a second passage diameter of the axial passage of the latch actuator pull sleeve.

16. The biased latch subassembly of claim 15, wherein the first passage diameter of the axial passage of the latch actuator pull sleeve is greater than the second passage diameter of the axial passage of the latch actuator pull sleeve.

* * * * *